US010939396B2

(12) United States Patent
Oh et al.

(10) Patent No.: US 10,939,396 B2
(45) Date of Patent: Mar. 2, 2021

(54) METHOD AND APPARATUS FOR TRANSMITTING OR RECEIVING SYNCHRONIZATION SIGNAL IN WIRELESS COMMUNICATION SYSTEM

(71) Applicant: Samsung Electronics Co., Ltd., Suwon-si (KR)

(72) Inventors: Jinyoung Oh, Suwon-si (KR); Sungjin Park, Suwon-si (KR); Jeongho Yeo, Suwon-si (KR); Heedon Gha, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/388,256

(22) Filed: Apr. 18, 2019

(65) Prior Publication Data

US 2019/0327696 A1    Oct. 24, 2019

(30) Foreign Application Priority Data

Apr. 18, 2018   (KR) .................. 10-2018-0044783

(51) Int. Cl.
*H04W 56/00*   (2009.01)
(52) U.S. Cl.
CPC ................. *H04W 56/001* (2013.01)
(58) Field of Classification Search
None
See application file for complete search history.

(56) References Cited

U.S. PATENT DOCUMENTS

2015/0049741 A1* 2/2015 Chen ................ H04W 56/0005
370/336
2017/0093620 A1   3/2017 Um et al.
(Continued)

FOREIGN PATENT DOCUMENTS

WO    2017/167083 A1    10/2017

OTHER PUBLICATIONS

Interdigital Inc., Considerations on Synchronization Signal for NR Unlicensed Spectrum, 3GPP TSG RAN WG1 Meeting 92, R1-1802647, Athens, Greece, Feb. 17, 2018.
(Continued)

*Primary Examiner* — Anh Ngoc M Nguyen
(74) *Attorney, Agent, or Firm* — Jefferson IP Law, LLP

(57) ABSTRACT

The disclosure relates to a communication method and system for converging a 5th-generation (5G) communication system for supporting higher data rates beyond a 4th-generation (4G) system with a technology for Internet of things (IoT). The disclosure may be applied to intelligent services based on the 5G communication technology and the IoT-related technology, such as smart homes, smart buildings, smart cities, smart cars, connected cars, health care, digital education, smart retail, and security and safety services. A method and an apparatus for transmitting or receiving a synchronization signal block in a wireless communication system which operates in an unlicensed band are provided. The method includes a method for configuring a synchronization signal block time resource and index by a node which is to transmit a synchronization signal block in an unlicensed band, and a method for determining a synchronization signal block index and acquiring time synchronization by a node which receives a transmitted synchronization signal block.

20 Claims, 13 Drawing Sheets

(56) References Cited

U.S. PATENT DOCUMENTS

2019/0387412 A1* 12/2019 Kim .................... H04W 56/001
2020/0084752 A1* 3/2020 strom ................. H04W 72/042

OTHER PUBLICATIONS

Nokia et al., Summary of Remaining Details on RACH Procedure, 3GPP TSG-RAN WG1#NR1801, R1-1801274, Vancouver, BC, Canada, Jan. 29, 2018.
Apple Inc., NR Unlicensed Physical Channel Design Considerations, 3GPP TSG RAN WG1 Meeting #92bis, R1-1804768, Sanya, China, Apr. 7, 2018.
International Search Report dated Jul. 29, 2019, issued in the International Application No. PCT/KR2019/004643.

* cited by examiner

METHOD AND APPARATUS FOR TRANSMITTING OR RECEIVING SYNCHRONIZATION SIGNAL IN WIRELESS COMMUNICATION SYSTEM

CROSS-REFERENCE TO RELATED APPLICATION(S)

This application is based on and claims priority under 35 U.S.C. 119(a) of a Korean patent application number 10-2018-0044783, filed on Apr. 18, 2018, in the Korean Intellectual Property Office, the disclosure of which is incorporated by reference herein in its entirety.

BACKGROUND

1. Field

The disclosure relates to a method and an apparatus for transmitting or receiving a synchronization signal in a wireless communication system. More particularly, the disclosure relates to a method for transmitting or receiving a synchronization signal by a base station or a terminal (or a transmission node or a reception node) which transmits or receives a signal in an unlicensed band.

2. Description of the Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a "beyond 4G network" or a "post long term evolution (LTE) system". The 5G communication system is considered to be implemented in higher frequency millimeter wave (mmWave) bands, e.g., 60 GHz bands, so as to accomplish higher data rates. To decrease the propagation loss of radio waves and increase the transmission distance, beamforming, massive multiple-input multiple-output (MIMO), full dimensional MIMO (FD-MIMO), array antenna, analog beamforming, and large scale antenna techniques are being discussed in 5G communication systems. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM Modulation (FQAM) and sliding window superposition coding (SWSC) as advanced coding modulation (ACM), and filter bank multi carrier (FBMC), non-orthogonal multiple access (NOMA), and sparse code multiple access (SCMA) as advanced access technologies have been developed.

The Internet, which is a human-centered connectivity network where humans generate and consume information, is now evolving to the Internet of things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "Security technology" have been demanded for IoT implementation, a sensor network, machine-to-machine (M2M) communication, machine-type communication (MTC), and so forth have recently been researched. Such an IoT environment may provide intelligent Internet technology services that create a new value to human life by collecting and analyzing data generated by connected things. The IoT may be applied to a variety of fields including smart homes, smart buildings, smart cities, smart cars or connected cars, smart grids, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

Therefore, there is a need for a method for transmitting or receiving a synchronization signal in a 5G communication system.

SUMMARY

Aspects of the disclosure are to address at least the above-mentioned problems and/or disadvantages and to provide at least the advantages described below. Accordingly, an aspect of the disclosure is to provide an apparatus and method for transmitting or receiving a synchronization signal by a base station or a terminal (or a transmission node or a reception node) which is to transmit a downlink (DL) or uplink signal in an unlicensed band. In particular, an aspect of the disclosure is to provide a method capable of increasing an opportunity that a base station will transmit a synchronization signal in an unlicensed band, and provide a method for allowing a terminal to correctly receive a synchronization signal transmitted through this configuration.

According to an embodiment of the disclosure, a transmission device (i.e., a base station or a terminal), which is to transmit a synchronization signal in an unlicensed band, can increase a resource (e.g., a time or frequency resource domain) on which a synchronization signal can be transmitted, or can additionally define or configure a resource on which a synchronization signal can be transmitted. Therefore, the opportunity that a channel access procedure (or listen-before talk (LBT)) will be performed and a synchronization signal will be transmitted in an unlicensed band can be increased, and thus a device having received a synchronization signal can more efficiently acquire time and frequency synchronization with a transmission device.

Additional aspects will be set forth in part in the description which follows and, in part, will be apparent from the description, or may be learned by practice of the presented embodiments The disclosure has been made to address the above-mentioned problems and disadvantages, and to provide at least the advantages described below.

In accordance with an aspect of the disclosure, a method of a base station in a wireless communication system is provided. The method includes identifying a number of synchronization signal blocks (SSBs) for an unlicensed band, time domain locations of the SSBs for the unlicensed band and the number of SSBs to be transmitted, identifying whether the unlicensed band is idle or not, and transmitting at least one SSB based on the number of SSBs to be transmitted in a case that the unlicensed band is idle.

In accordance with another aspect of the disclosure, a method of a terminal in a wireless communication system is provided, the method includes receiving configuration information on synchronization signal block (SSB) transmission, identifying a number of synchronization signal blocks (SSBs) for an unlicensed band, time domain locations of the SSBs for the unlicensed band, receiving at least one SSB on a unlicensed band, and acquiring a time synchronization with a base station based on the received at least one SSB and the configuration information.

In accordance with another aspect of the disclosure, a base station in a wireless communication system is provided. The base station includes a transceiver and at least one processor coupled with the transceiver and configured to identify a number of synchronization signal blocks (SSBs) for an unlicensed band, time domain locations of the SSBs for the unlicensed band and the number of SSBs to be transmitted, identify whether the unlicensed band is idle or not, and transmit at least one SSB based on the number of SSBs to be transmitted in a case that the unlicensed band is idle.

In accordance with another aspect of the disclosure, a terminal in a wireless communication system is provided. The terminal includes a transceiver and at least one processor coupled with the transceiver and configured to receive configuration information on SSB transmission, identify a number of SSBs for an unlicensed band, time domain locations of the SSBs for the unlicensed band, receive at least one SSB on a unlicensed band, and acquire a time synchronization with a base station based on the received at least one SSB and the configuration information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
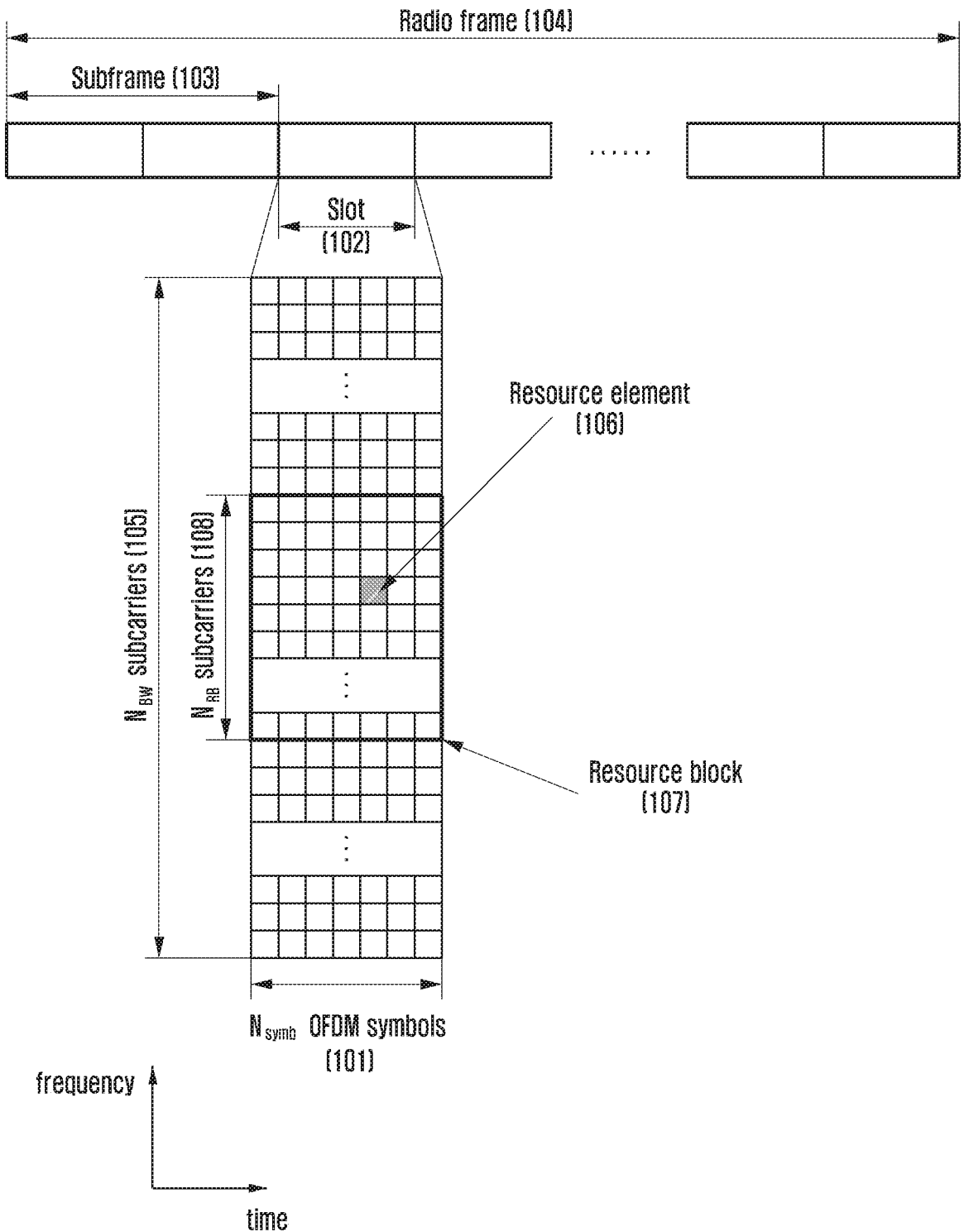
FIG. 1 is a view illustrating an uplink/downlink time-frequency domain transmission structure of a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, embodiments will be described with reference to the accompanying drawings. Further, in the following description of the disclosure, a detailed description of known functions or configurations incorporated herein will be omitted when the same may make the subject matter of the disclosure rather unclear. The terms which will be described below are defined based on the functions in the disclosure, and may be different according to the intention or practice of users and operators. Therefore, the definitions of the terms should be made based on the contents throughout the specification.

The advantages and features of the disclosure and methods of accomplishing the same will be apparent by making reference to the embodiments described below with reference to the accompanying drawings. However, the disclosure is not limited to the embodiments disclosed herein but may be implemented in various different forms. The following embodiments are provided only for completeness of the disclosure and completely informing those skilled in the art of the scope of the disclosure, and the disclosure is defined only by the scope of the appended claims. Throughout the specification, the same or like reference numerals designate the same or like elements.

Hereinafter, embodiments of the disclosure will be described with reference to the accompanying drawings.

In describing the embodiments of the disclosure, a description of technical contents, which are well-known in the technical field to which the disclosure pertains and are not directly associated with the disclosure, will be omitted. Such an omission of unnecessary descriptions is intended to prevent obscuring the subject matter of the disclosure and more clearly deliver the subject matter thereof.

For the same reason, some elements are exaggerated, omitted, or schematically illustrated in the accompanying drawings. Further, the size of each element does not entirely reflect its real size. In each drawing, the same or corresponding elements are denoted by the same reference numerals.

The advantages and features of the disclosure and methods of accomplishing the same will be apparent by making reference to the embodiments described below with reference to the accompanying drawings. However, the disclosure is not limited to the embodiments disclosed herein but may be implemented in various different forms. The following embodiments are provided only for completeness of the disclosure and completely informing those skilled in the art of the scope of the disclosure, and the disclosure is defined only by the scope of the appended claims. Throughout the specification, the same or like reference numerals designate the same or like elements.

Here, it may be understood that each block of processing flowcharts and combinations of the flowcharts may be performed by computer program instructions. Since these computer program instructions may be loaded into processors for a general computer, a special-purpose computer, or other programmable data-processing apparatuses, these instructions executed by the processors for the computer or the other programmable data-processing apparatuses create means performing functions described in block(s) of the flowcharts. Since these computer program instructions may also be stored in a computer-usable or computer-readable memory of a computer or other programmable data-processing apparatuses in order to implement the functions in a specific scheme, the computer program instructions stored in the computer-usable or computer-readable memory may also produce manufacturing articles including instruction means performing the functions described in block(s) of the flowcharts. Since the computer program instructions may also be loaded into a computer or other programmable data-processing apparatuses, the instructions may cause a series of operation steps to be performed on the computer or other programmable data-processing apparatuses so as to generate processes executable by the computer and enable an operation of the computer or other programmable data-processing apparatuses, and may also provide steps for implementing the functions described in the flowchart block(s).

In addition, each block may indicate some of modules, segments, or codes including one or more executable instructions for executing a specific logical function(s). Further, it is to be noted that the functions mentioned in the blocks may occur out of order in some alternative embodiments of the disclosure. For example, two blocks that are consecutively illustrated may be performed substantially concurrently or may sometimes be performed in the reverse order, according to corresponding functions.

Here, the term "~ unit" used in the embodiment means software or hardware elements, such as a field-programmable gate array (FPGA) and an application-specific integrated circuit (ASIC), and the "~ unit" may perform any roles. However, the meaning of "~ unit" is not limited to software or hardware. The "~ unit" may be configured to reside in a storage medium that may be addressed, and may also be configured to reproduce one or more processors. Accordingly, for example, the "~ unit" includes elements, such as software elements, object-oriented software elements, class elements, and task elements, and processors, functions, attributes, procedures, subroutines, segments of program code, drivers, firmware, microcode, circuits, data, databases, data structures, tables, arrays, and variables. The functions provided in the elements and "~ units" may be combined with a smaller number of elements and "~ units" or may be further separated into additional elements and "~ units". In addition, the elements and the "~ units" may also be implemented to reproduce one or more central processing units (CPUs) within a device or a security multimedia card. Further, in embodiments of the disclosure, a "~ unit" may include one or more processors.

A wireless communication system has been developed from a wireless communication system providing a voice-centered service in the early stage toward broadband wireless communication systems providing high-speed, high-quality packet data services compliant with communication standards, such as high-speed packet access (HSPA), long-term evolution (LTE) or evolved universal terrestrial radio access (E-UTRA), and LTE-advanced (LTE-A) of the $3^{rd}$ generation partnership project (3GPP), high-rate packet data (HRPD) and ultra-mobile broadband (UMB) of 3GPP2, 802.16e of IEEE, and the like. In addition, the 5G or new radio (NR) communication standards are being produced as the 5G wireless communication system.

As compared with the existing 4G system, the 5G system considers support for various services. Examples of the most representative services may include an enhanced mobile broad band (eMBB) service, an ultra-reliable and low-latency communication (URLLC) service, a massive machine-type communication (mMTC) service, an evolved multimedia broadcast/multicast service (eMBMS), and the like. In addition, a system for providing the URLLC service may be referred to as a "URLLC system," a system for providing the eMBB service may be referred to as an "eMBB system". Further, the terms "service" and "system" may be used interchangeably.

As described above, in wireless communication systems including 5G, at least one service among eMBB, mMTC, and ultra-reliable and URLLC may be provided to a terminal. The above-described services may be provided to the same terminal during the same time period. In an embodiment of the disclosure, eMBB may be a service aiming at high-speed transmission of high-capacity data, mMTC may be a service aiming at terminal power minimization and access of multiple terminals, and URLLC may be a service aiming at high reliability and low latency, but the disclosure is not limited thereto. The three services may be a main scenario in an LTE system or a system, such as 5G/NR after the LTE system.

When a base station has scheduled, for any terminal, data corresponding to an eMBB service during a particular transmission time interval (TTI), if there occurs a situation where URLLC data needs to be transmitted during the TTI, a part of the eMBB data may not be transmitted in a frequency band in which the eMBB data is already scheduled and transmitted, but the generated URLLC data may be transmitted in the frequency band. A terminal for which the eMBB has been scheduled and a terminal for which the URLLC has been scheduled may be identical or different. In the example, since there occurs a situation where a part of the eMBB data having already been scheduled and transmitted is not actually transmitted, the possibility that the eMBB data will be corrupted becomes higher.

In a wireless communication system, for example, an LTE or LTE-A system or a 5G system (or an NR system), it is possible to configure a base station to transmit downlink control information (DCI)) including resource allocation information and the like by using a downlink signal transmitted from the base station to a terminal through a physical downlink control channel (PDCCH), and a terminal to receive at least one downlink signal among DCI (e.g., a channel-state information reference signal (CSI-RS)), a physical broadcast channel (PBCH), or a downlink data channel (a physical downlink shared channel (PDSCH)).

For example, the base station transmits DCI, which instructs the terminal to receive a PDSCH in subframe n, to the terminal through a PDCCH in subframe n, and the terminal having received DCI receives a PDSCH in subframe n according to the received DCI. In addition, in the LTE or LTE-A system or the NR system, it is possible to configure the base station to transmit DCI including uplink resource allocation information to the terminal through a PDCCH, and the terminal to transmit, to the base station, at least one uplink signal among uplink control information (UCI) (e.g., a sounding reference signal (SRS), UCI, or a physical random access channel (PRACH)) or an uplink data channel (a physical uplink shared channel (PUSCH)). For example, the terminal, which has received uplink transmission configuration information (or uplink DCI or a UL grant), transmitted through a PDCCH, from the base station in subframe n, may perform uplink data channel transmission (hereinafter, PUSCH transmission) according to predefined time (e.g., n+4), time (e.g., n+k) configured by a higher layer signal, or uplink signal transmission time indicator information (e.g., n+k) included in the uplink transmission configuration information.

The terms which will be described below are defined based on the functions in the disclosure, and may be different according to the intention or practice of users and operators. Therefore, the definitions of the terms should be made based on the contents throughout the specification. Hereinafter, a base station (BS), is a main agent performing resource allocation for a terminal, and may be at least one of an eNode B, a Node B, a BS, a wireless access unit, a base station controller, and a node on a network. A terminal may include a user equipment (UE), a mobile station (MS), a cellular phone, a smart phone, a computer, or a multimedia system capable of performing a communication function. In the disclosure, a downlink (DL) means a radio transmission path of a signal transmitted from a base station to a terminal, and an uplink (UL) means a radio transmission path of a signal transmitted from the terminal to the base station. In addition, an embodiment implemented based on an LTE or LTE-A system is described below by way of example, but embodiments may be applied to other communication systems having a similar technical background or channel form. For example, 5G mobile communication technology (5G and NR), developed after LTE-A may be included in other communication systems. Further, according to the determination of those skilled in the art, embodiments may be applied to other communication systems through partial modification without departing from the scope of the disclosure.

As a representative example of broadband wireless communication systems, an NR system adopts an orthogonal frequency division multiplexing (OFDM) scheme in a DL, and adopts both an OFDM scheme and a single carrier frequency division multiple access (SC-FDMA) or DFT spread OFDM (DFT-s-OFDM) scheme in an uplink UL. The above-described multiple access scheme normally allocates and operates time-frequency resources, which carry data or control information to be transmitted according to users, so as to prevent the time-frequency resources from overlapping each other, that is, establish orthogonality, thus making it possible to distinguish the data or control information of one user from another.

If a decoding failure occurs upon initial transmission, the NR system adopts a hybrid automatic repeat request (HARQ) scheme for retransmitting the relevant data in a physical layer. If a receiver fails to accurately decode data, the HARQ scheme enables the receiver to transmit, to a transmitter, information (negative acknowledgement (NACK)) providing notification of the decoding failure so that the transmitter can retransmit the relevant data in the physical layer. The receiver combines the data retransmitted by the transmitter with the data of which the decoding has failed, thereby increasing reception performance of the data. In addition, if the receiver accurately decodes the data, information (acknowledgement (ACK)) providing notification of decoding success is transmitted to the transmitter so that the transmitter may transmit new data.

FIG. 1 is a view illustrating an uplink/downlink time-frequency domain transmission structure of a new radio (NR) system according to an embodiment of the disclosure. Specifically, FIG. 1 illustrates a basic structure of a time-frequency domain, that is, a radio resource domain, in which data or a control channel is transmitted in an uplink and a downlink of an NR system or a system similar thereto.

Referring to FIG. 1, the horizontal axis represents the time domain and the vertical axis represents the frequency domain. A minimum transmission unit in the time domain is an OFDM or DFT-s-OFDM symbol, in which one slot 102 is configured by collecting $N_{symb}$ OFDM or DFT-s-OFDM symbols 101. In this example, an OFDM symbol refers to a symbol in a case where a signal is transmitted or received using an OFDM multiplexing scheme, and a DFT-s-OFDM symbol refers to a symbol in a case where a signal is transmitted or received using a DFT-s-OFDM or SC-FDMA multiplexing scheme. In the disclosure, for convenience of description, while a description is given below, an OFDM symbol and a DFT-s-OFDM symbol will be collectively referred to as an "OFDM" without distinguishing between the former and the latter. Further, the description will be made focusing on transmission/reception of a downlink signal, but this configuration may also be applied to transmission/reception of an uplink signal.

If a subcarrier spacing is 15 kHz, one slot constitutes one subframe 103, in which the length of a slot and that of a subframe are both 1 ms. In this example, the number of slots constituting one subframe 103 and the length of a slot may be different depending on a subcarrier spacing. For example, if a subcarrier spacing is 30 kHz, one subframe 103 may be configured by collecting four slots, in which the length of a slot is 0.5 ms and the length of a subframe is 1 ms. In addition, a radio frame 104 is a time domain period including 10 subframes. A minimum transmission unit in the frequency domain is a subcarrier, in which the entire system transmission bandwidth includes a total of $N_{BW}$ subcarriers 105. In this configuration, the specific numerical values may be variably applied. For example, in the LTE system, a subcarrier spacing is 15 kHz, but one subframe 103 is configured by collecting two slots, in which the length of a slot is 0.5 ms and the length of a subframe is 1 ms.

A basic unit of resources in the time-frequency domain is a resource element (RE) 106, and may be represented by an OFDM symbol index and a subcarrier index. A resource block (RB) (or a physical resource block (PRB)) 107 may be defined by the $N_{symb}$ consecutive OFDM symbols 101 in the time domain and $N_{RB}$ consecutive subcarriers 108 in the frequency domain. Accordingly, in one slot, one RB 107 may include $N_{symb} \times N_{RB}$ REs 106. Generally, a minimum allocation unit of data in the frequency domain is the RB 107. In the NR system, generally, $N_{symb}=14$ and $N_{RB}=12$, and $N_{BW}$ may be proportional to the system transmission bandwidth. In the LTE system, generally, $N_{symb}=7$ and $N_{RB}=12$, and $N_{BW}$ may be proportional to the system transmission bandwidth.

DCI may be transmitted within first N OFDM symbols in the subframe. Generally, N may be configured such that N={1, 2, 3}, and a terminal may receive, from a base station, the number of symbols configured through a higher layer signal to enable transmission of DCI. In addition, according to the amount of control information which needs to be transmitted in a current subframe, the base station may change the number of symbols, in which DCI can be transmitted, in every subframe, and may deliver information on the number of symbols to the terminal through a separate downlink control channel.

In the NR or LTE system, scheduling information on downlink data or uplink data is transmitted from a base station to a terminal through DCI. The DCI is defined depending on various formats. Depending on each format, the DCI may indicate whether the DCI is scheduling information on uplink data (UL grant) or scheduling information on downlink data (DL grant), whether the DCI is compact DCI having a small-sized control information, whether the DCI is fallback DCI, whether to apply spatial multiplexing using a multiple antenna, whether the DCI is used for power control, or the like. For example, a DCI format (e.g., a DCI format 1_0 of NR) that is the scheduling control information on the downlink data (DL grant) may include at least one piece of information among the following pieces of control information.

Control information identifier (DCI format identifier): this identifies a format of the received DCI.

Frequency resource assignment (Frequency domain resource assignment): this indicates an RB allocated to data transmission.

Time resource assignment (Time domain resource assignment): this indicates a slot and a symbol allocated to data transmission.

VRB-to-PRB mapping: this indicates whether to apply VRB mapping scheme.

Modulation and coding scheme (MCS): this indicates a modulation scheme used for data transmission and the size of a transport block, that is, data to be transmitted.

New data indicator: this indicates HARQ initial transmission or retransmission.

Redundancy version: this indicates a redundancy version of a HARQ.

HARQ process number: this indicates a process number a HARQ.

PDSCH assignment information (Downlink assignment index): this indicates the number of PDSCH reception results (e.g., the number of HARQ-ACKs) which needs to be reported to a base station by a terminal.

Transmit power control (TPC) command for a physical uplink control channel (PUCCH): this indicates a TPC command for a PUCCH, that is, an uplink control channel.

PUCCH resource indicator: this indicates a PUCCH resource used for HARQ-ACK reporting which includes a result of reception of a PDSCH configured through relevant DCI.

PUCCH transmission timing indicator (PDSCH-to-HARQ feedback timing indicator): this indicates information on a slot or symbol in which a PUCCH needs to be transmitted, wherein a PUCCH is used for HARQ-ACK reporting which includes a result of reception of a PDSCH configured through relevant DCI.

The DCI may pass through a channel coding and modulation process and may then be transmitted through a PDCCH (or control information, which can be used interchangeably therewith below) or an enhanced PDCCH (EPDCCH) (or enhanced control information, which can be used interchangeably therewith below).

Generally, the DCI is independently scrambled with a particular radio network temporary identifier (RNTI) (or a cell-RNTI (C-RNTI), that is, a terminal identifier) for each terminal so as to have a cyclic redundant check (CRC) added thereto, is channel-coded, and is then configured as an independent PDCCH so as to be transmitted. In the time domain, the PDCCH is mapped and then transmitted during the control channel transmission period. A mapping location in the frequency domain of the PDCCH may be determined based on an identifier (ID) of each terminal and transmitted over the entire system transmission band or a configured frequency band.

The downlink data may be transmitted through a PDSCH that is a physical channel for downlink data transmission. The PDSCH may be transmitted after the control channel transmission period, and scheduling information including a specific mapping location in the frequency domain, a modulation scheme, and the like may be determined based on the DCI transmitted through the PDCCH.

By using the MCS among the pieces of control information constituting the DCI, a base station provides, to a terminal, notification of a modulation scheme applied to a PDSCH to be transmitted and the size of data (transport block size (TBS)) to be transmitted. In an embodiment of the disclosure, the MCS may include 5 bits or bits greater or less than 5 bits. The TBS corresponds to a size before channel coding for error correction is applied to data transport block (TB) to be transmitted by a base station.

Modulation schemes supported by the NR system include quadrature phase shift keying (QPSK), 16 quadrature amplitude modulation (16 QAM), 64 QAM, and 256 QAM of which modulation orders Qm correspond to 2, 4, 6, and 8, respectively. For example, in the case of QPSK modulation, 2 bits per symbol may be transmitted, in the case of the 16-QAM modulation, 4 bits per symbol may be transmitted, in the case of the 64-QAM modulation, 6 bits per symbol may be transmitted, and in the case of the 256-QAM modulation, 8 bits per symbol may be transmitted. In addition, a modulation scheme above 256 QAM may be used depending on system modification.

In the NR system, uplink and downlink HARQs adopts an asynchronous HARQ scheme in which a data retransmission time point is not fixed. The downlink is described by way of example. If the base station receives a feedback of the HARQ NACK from the terminal with respect to initial transmission data transmitted by the base station, the base station freely determines a transmission time point of retransmission data based on a scheduling operation. The terminal may buffer data, which has been determined as an error as a result of decoding the received data, for a HARQ operation, and may then combine the buffered data with data retransmitted by the base station. HARQ ACK/NACK information of a PDSCH transmitted in subframe n-k may be transmitted in subframe n from the terminal to the base station through a PUCCH or a PUSCH.

In the 5G communication system, such as NR, a value of k may be transmitted in a state of being included in DCI which indicates or schedules the reception of the PDSCH transmitted in subframe n-k, or the value of k may be configured for the terminal through a higher layer signal. In this example, the base station may configure one or more values of k through a higher layer signal, and may indicate a particular value of k through the DCI. In this example, k may be determined based on the HARQ-ACK processing capability of the terminal, that is, a minimum time required for the terminal to receive a PDSCH and generate and report a HARQ-ACK to the PDSCH. In addition, the terminal may use a predefined value or a default value until reception of a configured value of k.

Although the wireless communication system and the method and the apparatus proposed by an embodiment have been described with reference to the NR system, the contents of the disclosure is not limited to the NR system, but can be applied to various wireless communication systems, including LTE, LTE-A, LTE-A-Pro, 5G, and the like. Further, the disclosure is described with reference to a system for transmitting or receiving a signal in an unlicensed band, but the contents of the disclosure may also be applied to a system which operates in a licensed band.

In describing the wireless communication system and in the disclosure described below, higher layer signaling or a higher layer signal is a signal delivery method for delivering information from a base station to a terminal through a downlink data channel of a physical layer, or delivering information from a terminal to a base station through an uplink data channel of the physical layer, and examples of the signal delivery method may include a signal delivery method for delivering information through radio resource control (RRC) signaling, packet data convergence protocol (PDCP) signaling, or a medium access control (MAC) control element (MAC CE).

In a system for performing communication in an unlicensed band, a transmission device (i.e., a base station or a terminal), which is to transmit a signal in an unlicensed band, may perform a channel access procedure (or LBT) for the unlicensed band in which the transmission device is to perform the communication before transmission of a signal, and may transmit a signal if the unlicensed band is determined to be in an idle state through the performed channel access procedure. If the unlicensed band is determined not to be in the idle state through the performed channel access procedure, the transmission device may not transmit a signal.

In the channel access procedure in the unlicensed band, generally, the transmission device may measure strengths of signals received in the unlicensed band during a fixed period of time or a period of time calculated according to predefined rules (e.g., a period of time calculated using at least one random value selected by a base station or a terminal), and may determine an idle state of the unlicensed band by comparing the measured strengths thereof with a threshold which is predefined or is calculated by a function that determines a received signal strength and is configured by at least one variable among a channel bandwidth, a bandwidth in which a signal to be transmitted is transmitted, the strength of transmission power, and the like.

For example, the transmission device may measure a strength of a signal for 25 µs right before a time point at which the signal is to be transmitted. If the measured strength of the signal is less than a predefined or calculated threshold (e.g., −72 dBm), the transmission device may determine the unlicensed band to be in an idle state, and may transmit the configured signal. In this example, a maximum time, for which a signal can be successively transmitted after the execution of the channel access procedure, may be limited by a maximum channel occupancy time defined for each country, each region, and each frequency band according to unlicensed bands, and may also be limited by the type of transmission device (e.g., a base station, a terminal, a master device, or a slave device). For example, in Japan, in an unlicensed band which has been determined to be in an idle state after execution of a channel access procedure in 5 GHz unlicensed band, a base station or a terminal may continuously occupy the channel so as to transmit a signal, without execution of an additional channel access procedure during a period of time of a maximum of 4 ms.

More specifically, when the base station or the terminal is to transmit a downlink signal or an uplink signal in the unlicensed band, channel access procedures, which can be performed by the base station or the terminal, may be at least classified into the following types and may be described according the classified types.

Type 1: an uplink/downlink signal is transmitted after channel sensing of an unlicensed band for a variable time Type 2: an uplink/downlink signal is transmitted after channel sensing of an unlicensed band for a fixed time Type 3: a downlink or uplink signal is transmitted without sensing of a channel Hereinafter, in the disclosure, consideration is given to and a description will be made of a case in which a base station transmits a downlink signal to a terminal in an unlicensed band. However, the contents proposed in the disclosure can be identically applied to a case in which a terminal transmits an uplink signal to a base station, or the contents may be partially modified so as to be applied to the case. Therefore, a detailed description of the case of transmission of an uplink signal will be omitted.

The base station, which is to transmit a signal in the unlicensed band, may determine the type of channel access procedure based on the type of signal to be transmitted. For example, if the base station is to transmit a downlink signal including a downlink data channel in the unlicensed band, the base station may perform a type 1 channel access procedure. If the base station is to transmit a downlink signal, which does not include a downlink data channel, in the unlicensed band, for example, in the case of transmission of a synchronization signal or downlink control channel, the base station may perform a type 2 channel access procedure, and may transmit the downlink signal.

In this example, the base station may determine the type of channel access procedure based on the transmission length of a signal which is to be transmitted in the unlicensed band, a time for which the base station occupies and uses the unlicensed band, or the length of a period. Generally, a time required to perform the type 1 channel access procedure may be longer than a time required to perform the type 2 channel access procedure. Accordingly, if the base station is to transmit a signal for a short period of time or for a time shorter than or equal to a reference time (e.g., X ms or a Y symbol), the base station may perform the type 2 channel access procedure. In contrast, if the base station is to transmit a signal for a long period of time or for a time which exceeds or is longer than or equal to the reference time (e.g., X ms or a Y symbol), the base station may perform the type 1 channel access procedure. For example, the base station may perform different types of channel access procedures according to a use time of the unlicensed band.

If the type 1 channel access procedure is performed according to at least one of the criteria, a transmitter, which is to transmit a signal in an unlicensed band, may determine a channel access priority class based on a quality of service class identifier (QCI) of the signal, which is to be transmitted in the unlicensed band, and may perform a channel access procedure by using at least one value among the set values predefined in Table 1 below for the determined channel access priority class. For example, QCIs 1, 2, and 4 signify QCI values for services, such as conversational voice, conversational video (live streaming), and non-conversational video (buffered streaming), respectively. If the transmitter is to transmit a signal for a service, which is not matched to a QCI in Table 1 below, in an unlicensed band, the transmitter may select a QCI which is closest to the service among the QCIs in Table 1 below, and may select a channel access priority class according to the selected QCI.

Table 1 shows a mapping relationship between channel access priority classes and QCIs.

TABLE 1

| Channel access priority | QCI |
| --- | --- |
| 1 | 1, 3, 5, 65, 66, 69, 70 |
| 2 | 2, 7 |
| 3 | 4, 6, 8, 9 |
| 4 | — |

Figure 2:
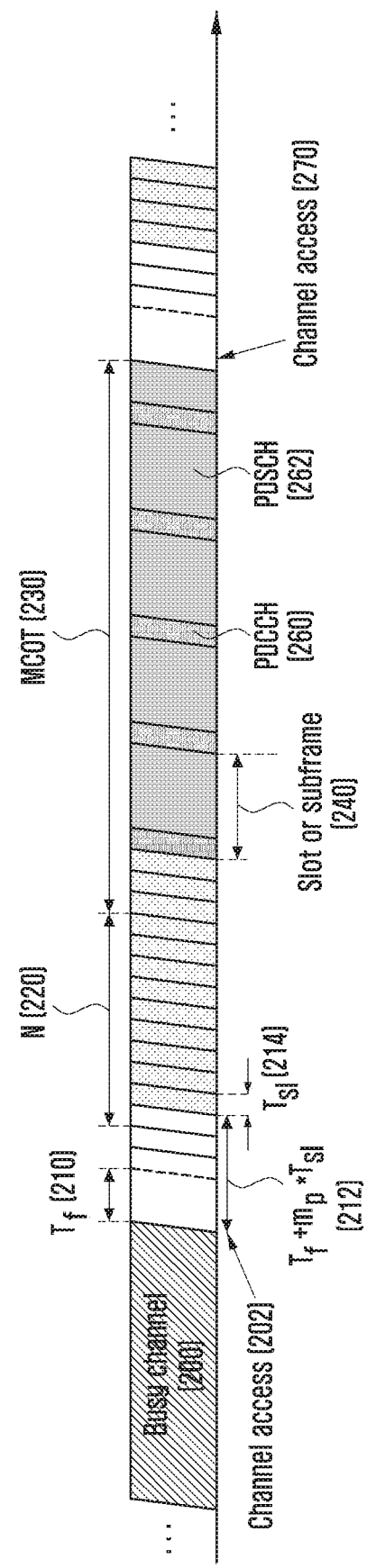
FIG. 2 is a view illustrating a channel access procedure in an unlicensed band according to an embodiment of the disclosure.

FIG. 2 is a view illustrating a channel access procedure in an unlicensed band according to an embodiment of the disclosure.

Referring to FIG. 2, for example, a defer duration, a set $CW_p$ of values or sizes of contention windows and a minimum value $CW_{min,p}$ and a maximum value $CW_{max,p}$ of a contention window, a maximum channel occupancy time $T_{mcot,p}$, and the like according to the determined channel access priority p may be determined based on Table 2 below. For example, a base station, which is to transmit a downlink signal in an unlicensed band, performs a channel access procedure 202 for the unlicensed band for a minimum of $T_f$ (210)+$m_p \cdot T_{sl}$ 212. If the base station is to perform a channel access procedure by using channel access priority class 3 (p=3), a length $T_f$+$m_p \cdot T_{sl}$ 212 of a defer duration required to perform the channel access procedure 202 is set using $m_p$=3. If the unlicensed band is determined to be in an idle state over the entire time $m_p \cdot T_{sl}$, N may be set such that N=N-1. In this example, N may be selected as any integer value among values ranging between 0 and a value $CW_p$ of a contention window at a time point at which the channel access procedure 202 is performed. For channel access priority class 3, a minimum value and a maximum value of a contention window are 15 and 63, respectively. If the unlicensed band is determined to be in an idle state in the contention window and a period during which an additional channel access procedure is performed, the base station may transmit a signal in the unlicensed band for a time $T_{mcot,p}$ (8 ms).

Table 2 below shows a channel access priority class in the downlink. In the disclosure, for convenience of description, a description will be made using a downlink channel access priority class, but in the case of uplink, the channel access priority class in Table 2 below may be reused, or a channel access priority class for uplink transmission may be defined and used.

TABLE 2

| Channel access priority class (p) | $m_p$ | $CW_{min,p}$ | $CW_{max,p}$ | $T_{mcot,p}$ | Allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial value $CW_p$ of a contention window is a minimum value $CW_{min,p}$ of a contention window. The base station having selected the value of N 220 may perform a channel access procedure in a period $T_{sl}$ 214. If an unlicensed band is determined to be in an idle state through the channel access procedure performed in the period $T_{sl}$ 214, the base station may change the value of N 220 such that N=N-1, and if N=0, may transmit a signal in the unlicensed band for up to a maximum of $T_{mcot,p}$. If the unlicensed band is determined not to be in an idle state through the channel access procedure performed in the period $T_{sl}$ 214, the base station may again perform a channel access procedure without changing the value of N 220.

A value $CW_p$ of the contention window may be changed with reference to a time point at which the base station starts a channel access procedure, or a time point at which the base station selects a value of N 220 in order to perform a channel access procedure or a result of reception of a downlink data channel in a reference subframe or a reference slot in a downlink signal transmission period (or MCOT 230, which includes PDCCH 260 and PDSCH 262) in which the base station most recently transmits a downlink signal in the unlicensed band right before the base station selects the value of N 220. In other words, the base station may receive a report on reception results of receptions of downlink data, which has been transmitted in the reference subframe or the reference slot, by a terminal, and may increase or minimize a size of $CW_p$ according to a NACK ratio Z among the received reception results.

Referring to FIG. 2, if a base station can receive, from a terminal, a report on a result of reception of a downlink data channel in relation to "a time point 270 at which the base station starts a channel access procedure, or a time point at which the base station selects a value of N 220 in order to perform a channel access procedure or a first subframe 240 of a downlink signal transmission period 230 in which the base station most recently transmits a downlink signal in the unlicensed band right before the base station selects the value of N 220", the first subframe becomes a reference subframe. If the base station cannot receive, from the terminal, the report on the result of reception of a downlink data channel in relation to the first subframe 240, for example, if a time interval between the first subframe and the time point 270, at which the base station starts a channel access procedure, is shorter than or equal to n slots or subframes, in other words, if the base station starts a channel access procedure before a time point at which the terminal can report the result of reception of a downlink data channel in relation to the first subframe 240, a first subframe of the most recent downlink signal transmission period which is transmitted before the downlink signal transmission period 230 becomes a reference subframe.

In other words, if the base station does not receive, from the terminal, a time point 270 at which the base station starts a channel access procedure, or a time point at which the base station selects a value of N 220 in order to perform a channel access procedure or a result of reception of downlink data transmitted in the reference subframe 240 right before the base station selects the value of N 220, the base station may determine, as a reference subframe, a first subframe of the most recently transmitted downlink signal transmission period among results of receptions of downlink data channels previously received from terminals. Thereafter, the base station may determine the size of a contention window, used in the channel access procedure 270, based on the result of the reception of downlink data received from the terminals in relation to downlink data transmitted through a downlink data channel in the reference subframe.

For example, if 80 percent or more of the results of receptions of downlink data by the terminal is determined as NACK, wherein the downlink data has been transmitted to the terminal through a downlink data channel in a first subframe among downlink signals transmitted in the unlicensed band, the base station, which has transmitted a downlink signal through a channel access procedure (e.g., $CW_p=15$) configured using a channel access priority class 3 (p=3), may increase a value of a contention window from an initial value ($CW_p=15$) to a value ($CW_p=31$) of a next contention window.

If 80 percent or more of the results of the receptions of downlink data by the terminal is not determined as NACK, for a value of a contention window, the base station may maintain an existing value or may change to the initial value thereof. In this example, the change of the contention window may commonly applied to all the channel access priority classes, or may applied to only the channel access priority class used in the channel access procedure. In this example, the following description will be made of a method for determining a reception result, that is, a method for determining a value of Z, which is effective to determine a change of the size of the contention window among the reception results of the receptions of downlink data which are transmitted or reported to the base station by the terminal is, wherein the downlink data is transmitted through a downlink data channel in a reference subframe or a reference slot for determination of a change of the size of the contention window.

If the base station transmits at least one codeword or TB to at least one terminal in the reference subframe or the reference slot, for the TB received by the terminal in the reference subframe or the reference slot, the base station may determine a value of Z based on the ratio of NACKs over the reception results transmitted or reported by the terminal. For example, it two codewords or two TBs are transmitted to one terminal in the reference subframe or the reference slot, the base station may receive, from the terminal, a result of reception of a downlink data signal related to the two TBs, or may receive, from the terminal, a report on the result of reception of a downlink data signal related to the two TBs. If a ratio Z of NACKs over the two reception results is greater than or equal to a threshold (e.g., Z=80%) which is predefined or is set between the base station and the terminal, the base station may change or increase the size of the contention window.

In this example, if the terminal bundles reception results of reception of downlink data related to one or more subframes (e.g., M subframes), including the reference subframe or slot and transmits or reports the bundled reception results to the base station, the base station may determine that the terminal has transmitted M reception results. In addition, the base station may determine a value of Z based on the ratio of NACKs over the M reception results, and may change, maintain, or initialize the size of a contention window.

If the reference subframe corresponds to a reception result related to a second slot among two slots constituting one subframe, a value of Z may be determined based on the ratio of NACKs over reception results transmitted or reported to the base station by the terminal in relation to downlink data received in the reference subframe (i.e., the second slot) and the next subframe.

In addition, when scheduling information for a downlink data channel or DCI, which is transmitted by the base station, is transmitted in a cell or a frequency band identical to a cell or a frequency band in which the downlink data channel is transmitted, or when scheduling information for a downlink data channel or DCI, which is transmitted by the base station, is transmitted in an unlicensed band but is transmitted in a cell or at a frequency different from a cell in which the downlink data channel is transmitted, if the terminal is determined not to transmit a result of reception of downlink data received in the reference subframe or the reference slot, and if a result of reception of the downlink data transmitted by the terminal is determined as DTX, NACK/DTX, or any state, the base station may determine the value of Z by determining a result of the reception by the terminal as NACK.

In addition, when scheduling information for a downlink data channel or DCI, which is transmitted by the base station, is transmitted in a licensed band, or when a result of reception of the downlink data transmitted by the terminal is determined as DTX, NACK/DTX, or any state, the base station may not include a result of the reception by the terminal in a reference value Z for a change of a contention window. In other words, the base station may ignore the result of the reception by the terminal and may determine a vale of Z.

Further, when the base station transmits scheduling information for a downlink data channel or DCI in a licensed band, if the base station does not actually transmit downlink data (no transmission) among results of receptions of downlink data related to a reference subframe or a reference slot transmitted or reported to the base station by the terminal, the base station may ignore a result of the reception transmitted or reported by the terminal in relation to the downlink data and may determine a value of Z.

In the 5G system, it is necessary to flexibly define and operate a frame structure in consideration various services and requirements. As an example, respective services may consider that the respective services have different subcarrier spacings according to requirements. Currently, in the 5G communication system, a scheme for supporting multiple subcarrier spacings may be determined by Equation 1 below.

$$\Delta f = f_0 2^m \qquad \text{Equation 1}$$

In Equation 1, $f_0$ represents a basic subcarrier spacing of the system, and m represents a scaling factor having an integer value. For example, if $f_0$ is 15 kHz, a set of subcarrier spacings that the 5G communication system can have may include 3.75 kHz, 7.5 kHz, 15 kHz, 30 kHz, 60 kHz, 120 kHz, 240 kHz, 480 kHz, and the like. A usable subcarrier spacing sets may be different according to frequency bands. For example, in a frequency band below 6 GHz, 3.75 kHz, 7.5 kHz, 15 kHz, 30 kHz, and 60 kHz may be used, and in a frequency band above 6 GHz, 60 kHz, 120 kHz, 240 kHz may be used.

A length of an OFDM symbol may be changed depending on a subcarrier spacing for an OFDM symbol. This is because, due to characteristics of an OFDM symbol, a subcarrier spacing and the length of an OFDM symbol have a reciprocal relationship with each other. For example, if the subcarrier spacing is increased twice, the length of an OFDM symbol is halved. In contrast, if the subcarrier spacing is halved, the length of an OFDM symbol is increased twice.

Next, a description will be made of a structure in which a synchronization signal and a PBCH are transmitted in a 5G communication system.

Figure 3:
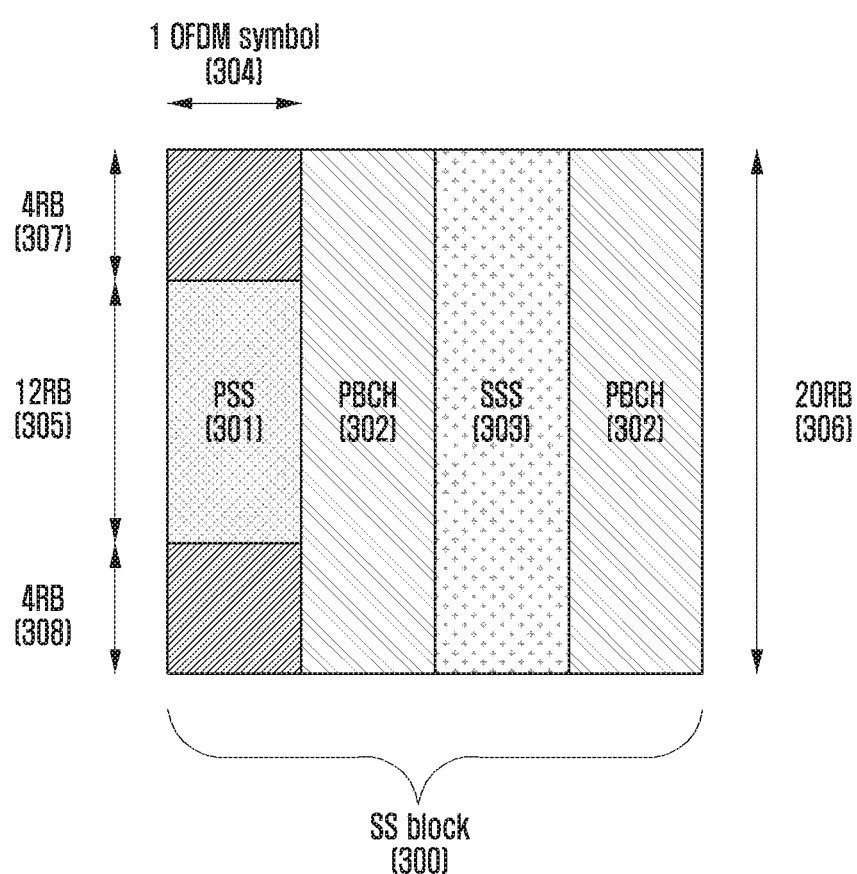
FIG. 3 is a view illustrating a synchronization signal block in an NR system according to an embodiment of the disclosure.

FIG. 3 is a view illustrating a synchronization signal block in an NR system according to an embodiment of the disclosure.

Referring to FIG. 3, a synchronization signal block (SS block) or an SS/PBCH block 300 considered in the 5G communication system is illustrated. The SS block 300 includes a primary synchronization signal (PSS) 301, a secondary synchronization signal (SSS) 303, and a PBCH 302.

The PSS 301 and the SSS 303 may be transmitted on 12 RBs 305 on the frequency axis, and in one OFDM symbol 304 on the time axis. In the 5G system, a total of 1008 different cell IDs may be defined, the PSS 301 may have three different values according to a physical layer identification (ID) of a cell, and the SSS 303 may have 336 different values. Through detection of the PSS 301 and the SSS 303, a terminal may know one of the 1008 cell IDs from a combination of the detected PSS 301 and SSS 303. This configuration may be expressed by Equation 2 below.

$$N_{ID}^{cell} = 3N_{ID}^{(1)} + N_{ID}^{(2)}$$  Equation 2

$N_{ID}^{(1)}$ may be estimated from the SSS 303, and has a value between 0 and 335. $N_{ID}^{(2)}$ may be estimated from the PSS 301, and has a value between 0 and 2. A value of $N_{ID}^{cell}$, that is, a cell ID, may be estimated from a combination of $N_{ID}^{(1)}$ and $N_{ID}^{(2)}$.

The PBCH 302 may be transmitted on 20 RBs 306 on the frequency axis and two OFDM symbols 304 on the time axis. Various pieces of system information, which are referred to as "master information block (MIB)", may be transmitted through the PBCH 302, and some or all of the following pieces of information may be transmitted through a PBCH.

System frame number (SFN)
Most significant bit (MSB) of SS/PBCH block index (for above 6 GHz frequency)
Half frame timing
Subcarrier spacing for common control
SS/PBCH subcarrier offset
DMRS type A position for PDSCH
System information block 1 (SIB1) PDCCH configuration
Cell barring information
Spare
CRC As described above, the SS block 300 includes the PSS 301, the SSS 303, and the PBCH 302, and is mapped in a total of 4 OFDM symbols on the time axis. A transmission bandwidth (12 RBs 305) of the PSS 301 and a transmission bandwidth (20 RBs 306) of the SSS (303) and the PBCH 302 are differently related. In an OFDM symbol in which the PSS 301 and the SSS 303 are transmitted within the transmission bandwidth (20 RBs 306) of the PBCH 302, the 12 RBs on which the PSS 301 is transmitted are located in the middle of the OFDM symbol, 4 RBs 307 and 4 RBs 308 are located on both sides of the 12 middle RBs, and a corresponding region 307 and a corresponding region 308 may be used to transmit different signals or may be empty.

All SS blocks may be transmitted using the same analog beam. For example, the PSS 301, the SSS 303, and the PBCH 302 may all be transmitted using the same beam. Analog beams do not have such characteristics with which the analog beams can be differently applied on the frequency axis. Therefore, the same analog beam is applied to all RBs on the frequency axis in a particular OFDM symbol to which a particular analog beam is applied. For example, four OFDM symbols, in which the PSS 301, the SSS 303, and the PBCH 302 are transmitted, may all be transmitted using the same analog beam.

Figure 4:
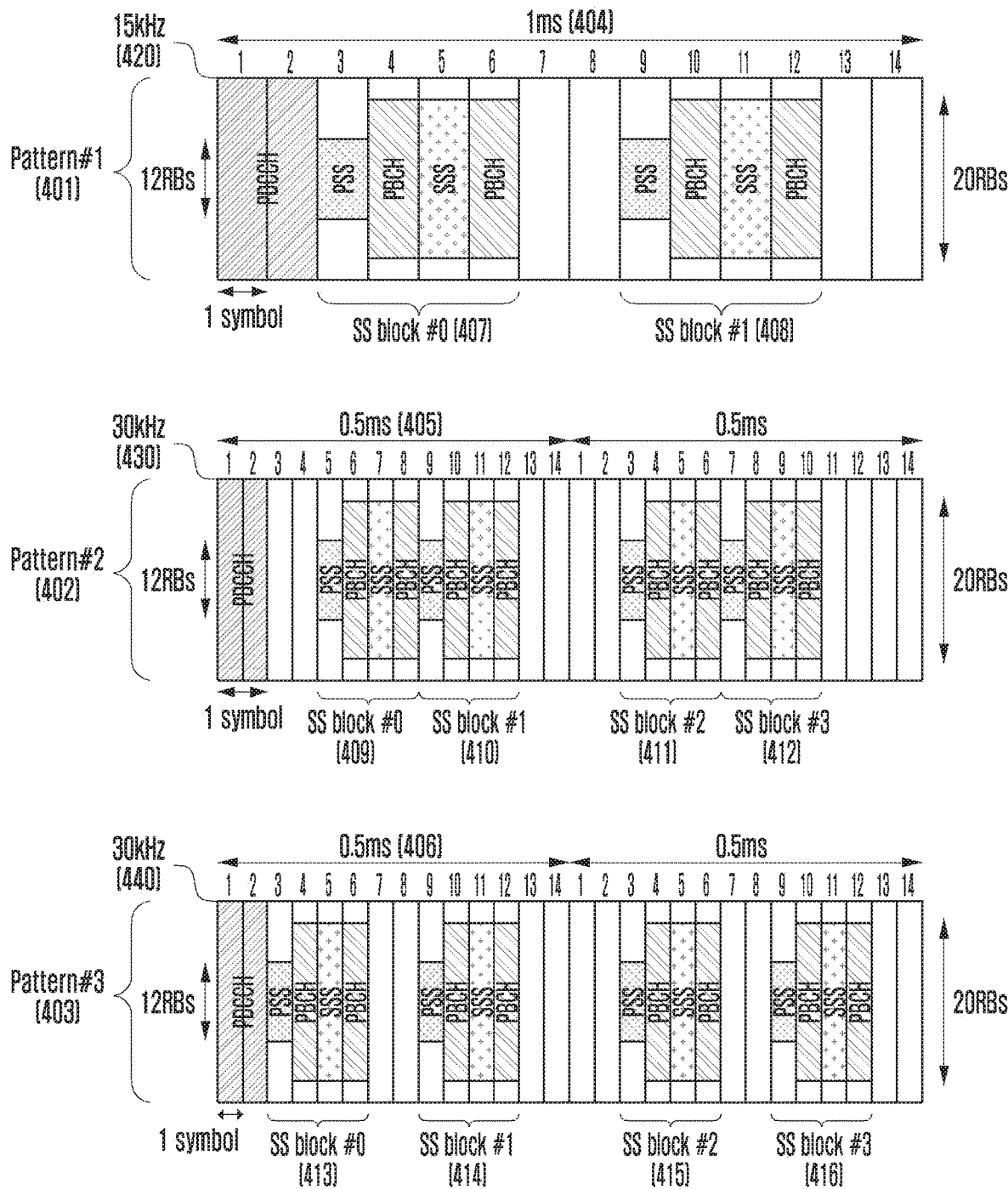
FIG. 4 is a view illustrating a synchronization signal block time resource domain in an NR system according to an embodiment of the disclosure.

FIG. 4 is a view illustrating a synchronization signal block time resource domain in an NR system according to an embodiment of the disclosure.

Referring to FIG. 4, transmission patterns of an SS block in the frequency band below 6 GHz considered in the 5G communication system are illustrated. In the frequency band below 6 GHz of the 5G communication system, a subcarrier spacing of 15 kHz (as indicated by reference numeral 420) and a subcarrier spacing of 30 kHz (as indicated by reference numerals 430 or 440) may be used to transmit an SS block. In the case of the subcarrier spacing of 15 kHz, a transmission pattern (a pattern #1 401) for one SS block exists, and in the case of the subcarrier spacing of 30 kHz, transmission patterns (a pattern #2 402 and a pattern #3 403) for two SS blocks exist.

In the SS block pattern #1 401 according to the subcarrier spacing of 15 kHz (as indicated by reference numeral 420), a maximum of two SS blocks may be transmitted within 1 ms 404 (or which corresponds to one slot length if one slot includes 14 OFDM symbols). In FIG. 4, an SS block #0 407 and an SS block #1 408 are illustrated as an example. In this example, the SS block #0 407 may be mapped to four consecutive symbols in a third OFDM symbol, and the SS block #1 408 may be mapped to four consecutive symbols in a ninth OFDM symbol. Different analog beams may be applied to the SS block #0 407 and the SS block #1 408. Accordingly, the same beam may be applied to all the third to sixth OFDM symbols to which the SS block #0 407 is mapped, and the same beam may be applied to all ninth to twelfth OFDM symbols to which the SS block #1 408 is mapped. A beam to be used for seventh, eighth, thirteenth, and fourteenth OFDM symbols, to which SS blocks are not mapped, may be freely determined by the judgement of a base station.

In the SS block pattern #2 402 according to the subcarrier spacing of 30 kHz (as indicated by reference numeral 430), a maximum of two SS blocks may be transmitted within 0.5 ms 405 (or which corresponds to one slot length if one slot includes 14 OFDM symbols), and thus a maximum of four SS blocks may be transmitted within 1 ms (or which corresponds to the length of two slots if one slot includes 14 OFDM symbols). FIG. 4 illustrates an example in which an SS block #0 409, an SS block #1 410, an SS block #2 411, and an SS block #3 412 are transmitted in 1 ms (two slots). In this example, the SS block #0 409 and the SS block #1 410 may be mapped from a fifth OFDM symbol of a first slot and from a ninth OFDM symbol of the first slot, respectively. The SS block #2 411 and the SS block #3 412 may be mapped from a third OFDM symbol of a second slot and from a seventh OFDM symbol of the second slot, respectively.

Different analog beams may be applied to the SS block #0 409, the SS block #1 410, the SS block #2 411, and the SS block #3 412. Accordingly, the same analog beam may be applied to all the fifth to eighth OFDM symbols of the first slot in which the SS block #0 409 is transmitted, and the ninth to twelfth OFDM symbols of the first slot in which the SS block #1 410 is transmitted, the third to sixth symbols of the second slot in which the SS block #2 411 is transmitted, and the seventh to tenth symbols of the second slot in which the SS block #3 412 is transmitted. A beam to be used for OFDM symbols, to which SS blocks are not mapped, may be freely determined by the judgement of the base station.

In the SS block pattern #3 403 according to the subcarrier spacing of 30 kHz (as indicated by reference numeral 440), a maximum of two SS blocks may be transmitted within 0.5 ms 406 (or which corresponds to one slot length if one slot includes 14 OFDM symbols), and thus a maximum of four SS blocks may be transmitted within 1 ms (or which corresponds to the length of two slots if one slot includes 14 OFDM symbols). FIG. 4 illustrates an example in which an SS block #0 413, an SS block #1 414, an SS block #2 415, and an SS block #3 416 are transmitted in 1 ms (two slots). In this example, the SS block #0 413 and the SS block #1 414 may be mapped from a third OFDM symbol of a first slot and from a ninth OFDM symbol of the first slot, respectively. The SS block #2 415 and the SS block #3 416 may be mapped from a third OFDM symbol of a second slot and from a ninth OFDM symbol of the second slot, respectively.

Different analog beams may be used for the SS block #0 413, the SS block #1 414, the SS block #2 415, and the SS block #3 416, respectively. As described above, the same analog beam may be used for all the four OFDM symbols in which the respective SS blocks are transmitted. A beam to be used for OFDM symbols, to which SS blocks are not mapped, may be freely determined by the judgement of the base station.

Figure 5:
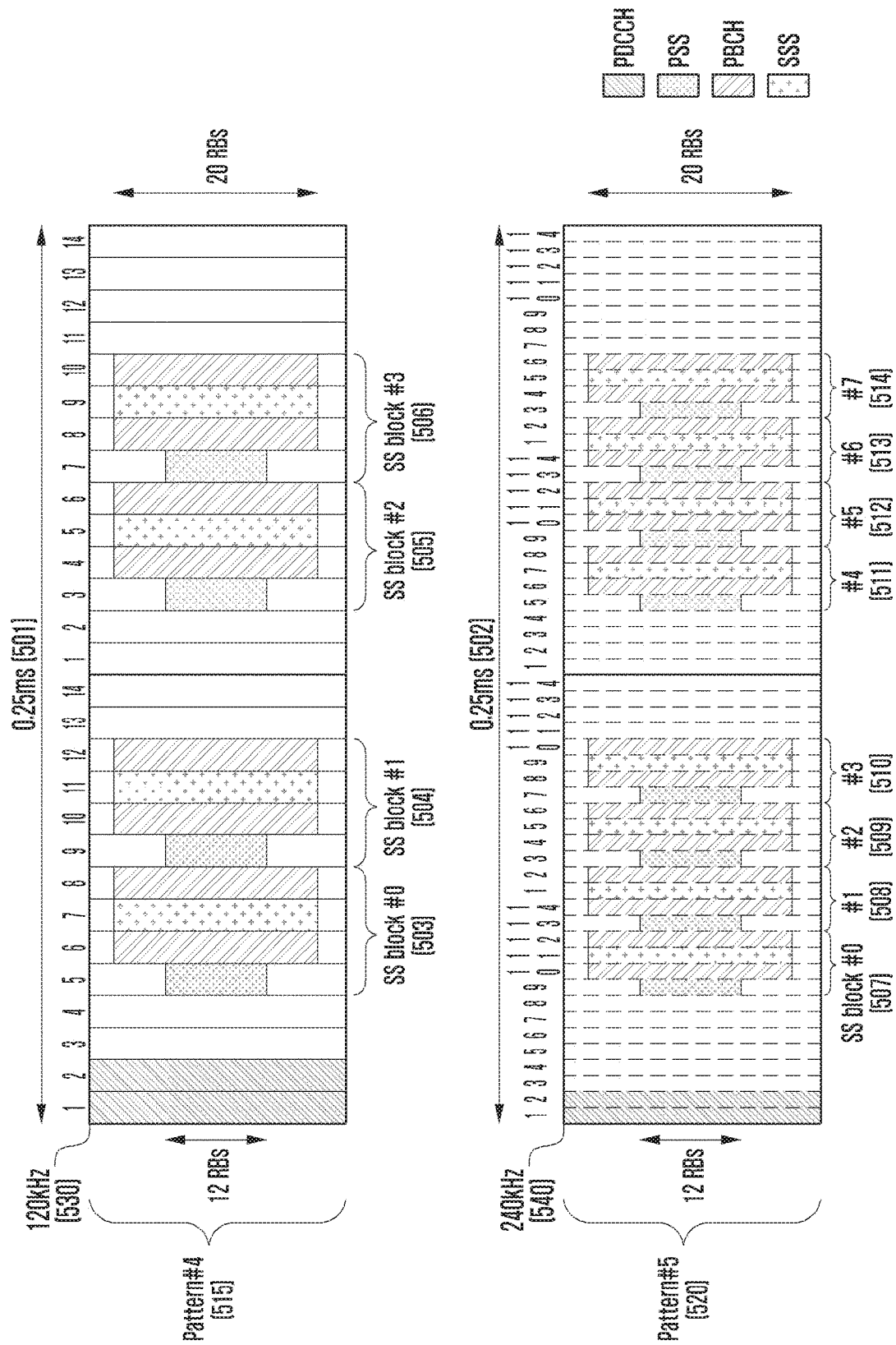
FIG. 5 is a view illustrating a synchronization signal block time resource domain in an NR system according to an embodiment of the disclosure.

FIG. 5 is a view illustrating a synchronization signal block time resource domain in an NR system according to an embodiment of the disclosure.

Referring to FIG. 5, transmission patterns of an SS block in the frequency band above 6 GHz considered in the 5G communication system are illustrated. In the frequency band above 6 GHz of the 5G communication system, a subcarrier spacing of 120 kHz (as indicated by reference numeral 530) and a subcarrier spacing of 240 kHz (as indicated by reference numeral 540) may be used to transmit an SS block.

In an SS block pattern #4 515 according to the subcarrier spacing of 120 kHz (as indicated by reference numeral 530), a maximum of four SS blocks may be transmitted within 0.25 ms 501 (or which corresponds to the length of two slots if one slot includes 14 OFDM symbols). FIG. 5 illustrates an example in which an SS block #0 503, an SS block #1 504, an SS block #2 505, and an SS block #3 506 are transmitted in 0.25 ms (two slots). In this example, the SS block #0 503 and the SS block #1 504 may be mapped from a fifth OFDM symbol of a first slot and from a ninth OFDM symbol of the first slot, respectively. The SS block #2 505 and the SS block #3 506 may be mapped from a third OFDM symbol of a second slot and from a seventh OFDM symbol of the second slot, respectively.

As described above, different analog beams may be used for the SS block #0 413, the SS block #1 414, the SS block #2 415, and the SS block #3 416, respectively. The same analog beam may be used for all four OFDM symbols in which the respective SS blocks are transmitted, and a beam to be used for OFDM symbols, to which SS blocks are not mapped, may be freely determined by the judgement of the base station.

In an SS block pattern #5 520 according to the subcarrier spacing of 240 kHz (as indicated by reference numeral 540), a maximum of eight SS blocks may be transmitted within 0.25 ms 502 (or which corresponds to the length of four slots if one slot includes 14 OFDM symbols). FIG. 5 illustrates an example in which an SS block #0 507, an SS block #1 508, an SS block #2 509, an SS block #3 510, an SS block #4 511, an SS block #5 512, an SS block #6 513, and an SS block #7 514 are transmitted in 0.25 ms (four slots). In this example, the SS block #0 507 and the SS block #1 508 may be mapped from a ninth OFDM symbol of a first slot and from a thirteenth OFDM symbol of the first slot, respectively. The SS block #2 509 and the SS block #3 510 may be mapped from a third OFDM symbol of a second slot and from a seventh OFDM symbol of the second slot, respectively. The SS block #4 511, the SS block #5 512, and the SS block #6 513 may be mapped from a fifth OFDM symbol of a third slot, from a ninth OFDM symbol of the third slot, and from a thirteenth OFDM symbol of the third slot, respectively. The SS block #7 514 may be mapped from a third OFDM symbol of a fourth slot.

As described above, different analog beams may be used for the SS block #0 507, the SS block #1 508, the SS block #2 509, the SS block #3 510, the SS block #4 511, the SS block #5 512, the SS block #6 513, and the SS block #7 514, respectively. The same analog beam may be used for all four OFDM symbols in which the respective SS blocks are transmitted, and a beam to be used for OFDM symbols, to which SS blocks are not mapped, may be freely determined by the judgement of the base station.

Figure 6:
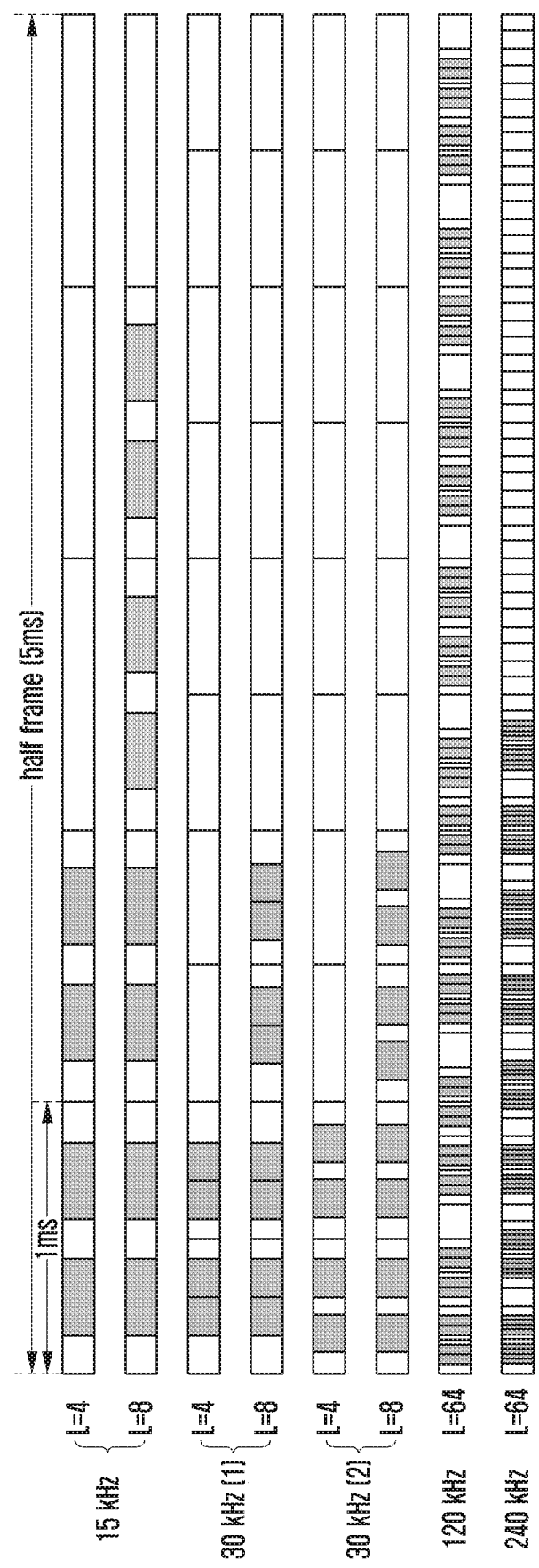
FIG. 6 is a view illustrating an entire time resource domain of a synchronization signal block which can be transmitted in an NR system according to an embodiment of the disclosure.

FIG. 6 is a view illustrating an entire time resource domain of a synchronization signal block which can be transmitted in an NR system according to an embodiment of the disclosure.

Referring to FIG. 6, a maximum of 64 SS blocks may be transmitted in a particular time period (e.g., a period of 5 ms), and the number L of the transmitted SS blocks may be changed according to a value of at least one of a subcarrier spacing of an SS block and a carrier frequency for transmission of an SS block. For example, in a frequency band below 3 GHz, a maximum of four SS blocks may be transmitted in the above-described time period. In a frequency band from 3 GHz to 6 GHz, a maximum of eight SS blocks may be transmitted in the above-described time period. In a frequency band above 6 GHz, a maximum of 64 SS blocks may be transmitted in the above-described time period. This configuration may be schematically illustrated as in FIG. 6. In this example, the maximum number of SS blocks transmissible according to a frequency band is only an example, and the disclosure is not limited thereto.

Accordingly, when an SS block is transmitted in an unlicensed band, one or more SS blocks may not be transmitted according to a channel access procedure. If an SS block fails to be correctly transmitted, there may occur problems, including delay of synchronization acquisition or delay of initial access, and the like of a terminal. Therefore, the disclosure proposes a method and an apparatus for efficiently transmitting an SS block in an unlicensed band by a base station, and a method and an apparatus for correctly receiving a transmitted SS block and acquiring synchronization by a terminal.

Hereinafter, a method and an apparatus for efficiently transmitting an SS block which are proposed in embodiments are not limited and applied to each embodiment of the disclosure, but a combination of the contents of all or some of one or more embodiments proposed in the disclosure may be utilized for the method and the apparatus.

First Embodiment

In order to increase the probability or opportunity that an SS block will be transmitted in an unlicensed band, SS blocks, the number of which is larger than or equal to that of transmissible SS blocks defined in a licensed band, may be configured to be transmitted in the unlicensed band. For example, if an SS block is transmitted with a subcarrier spacing of 15 kHz in a licensed band, a maximum of four or eight SS blocks may be transmitted as illustrated in FIG. 6, and the maximum number of transmissible SS blocks may be independently defined or configured according to a frequency band in which an SS block is transmitted. In this example, a time domain location, at which each SS block can be transmitted, may be defined as illustrated in FIG. 6. A time domain location of an SS block transmitted in an unlicensed band may be identical to that of an SS block transmitted in a licensed band, may be additionally defined together with the time domain location of the SS block transmitted in the licensed band, or may be different from that of the SS block transmitted in the licensed band.

If an SS block is transmitted with a subcarrier spacing of 15 kHz in an unlicensed band, before a transmission time point of an SS block which is to be transmitted, a base station may perform a channel sensing operation which should be performed before transmission of an SS block. If the unlicensed band is determined to be in an idle state through the channel sensing operation, the base station may transmit an SS block. If an SS block is transmitted together with at least one control channel or data channel, the base station may perform a channel sensing operation which should be performed for transmission of a control channel or a data channel.

In this example, the base station may not transmit at least one SS block according to a result of the channel sensing operation, which may cause initial access delay or synchronization performance degradation of a terminal. If an SS block is associated with a direction of a transmission beam and a particular SS block cannot be transmitted, it implies that an SS block cannot be transmitted in a direction of a beam associated with the SS block. In this situation, synchronization performances of terminals located in the direction of the beam may be degraded, and thus the transmission of an SS block is important. In this regard, as compared with a case in which an SS block is transmitted in a licensed band, in order to increase the probability or opportunity that an SS block will be transmitted in an unlicensed band, the following method may be employed.

Method 1: the number N of SS blocks transmissible in a particular time period (e.g., a period X ms or Y slots) and a time domain resource for this configuration are all predefined, and the base station transmits a maximum of L SS blocks in a relevant domain. At least one value among the time period (X or Y) and the number of SS blocks (N or L) may be predefined, or may be configured through a higher layer signal or system information (e.g., MIB or SIB).

Figure 7:
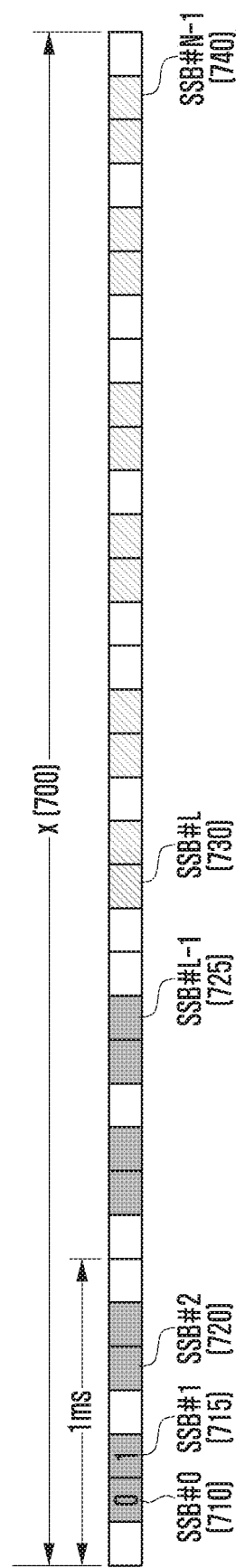
FIG. 7 is a view illustrating an embodiment according to an embodiment of the disclosure.

FIG. 7 is a view illustrating an embodiment according to an embodiment of the disclosure.

Referring to FIG. 7, a definition is made of a time domain resource which is related to an SS block candidate and on which an SS block can be transmitted with a particular subcarrier spacing (e.g., 15 kHz) within a particular time period X 700. An SS block index may be mapped from 0 to N−1 in order of time or slot indices. In this example, N may have a value, which is predefined according to a frequency band or declared by a transmission node, and may be greater than or equal to the maximum number L of SS blocks which is defined for each frequency band in a licensed band.

If N>L, after L SS block indices are mapped, an SS block index may again returns to zero so as to be mapped. For example, SS block indices of N SS blocks may be sequentially mapped to #0, #1, . . . , #L−1, #0, #1, . . . #N−L−1. In contrast, the SS block indices do not return and may be sequentially mapped up to N. For example, SS block indices of N SS blocks may be sequentially mapped to #0, #1, . . . , #N−2, #N−1. In this example, in order to indicate a value of N>L, a size of a bit string of SS block indices delivered through a PBCH in an SS block may be increased. For example, if N=128, in order to indicate L(=64) SS block indices in a current licensed band, the size of 3-bit SS block index field delivered through a PBCH in an SS block may be increased to 4 bits. In order to a value of N>L for the above-described case, a size of a bit string of an SS block index delivered through a PBCH in an SS block may be maintained, (e.g., even if N=128, a size of 3-bit SS block index field delivered through a PBCH in an SS block in order to L(=64) SS block indices in a current licensed band is maintained), and the number of SS blocks associated with or mapped to a DMRS sequence may be increased.

In addition, a value of N may be changed according to the particular time period. For example, if the maximum number of SS blocks transmissible within the particular time period X 700 is N, the maximum number of SS blocks transmissible within a time period X' (X'<X) may be N=N' (N' In this example, with respect to at least one value among X, X', N, and N', a reception node (hereinafter, a "terminal") may receive the configured value from a transmission node through at least one signaling scheme among a higher layer signal and system information (MIB or SIB). Values of N and N' may be differently set according to a subcarrier spacing of an SS block. In this example, X and X' may be predefined as a half-frame or frame time, or the like between the base station and the terminal, or may be configured through a higher layer signal by the base station.

Further, the SS block transmission periods X may be differently configured according to SS block transmission cycles. For example, with respect to an SS block transmitted at every cycle T1, the terminal may assume that PBCH information at least except for an SFN is not changed within T (80 ms in the NR system). In this example, T1 has a value less than or equal to T. In other words, a PBCH in an SS block transmitted at every cycle T may be repeatedly transmitted at every cycle T1, and thus transmission of an SS block transmitted at every cycle T is more important. Accordingly, the base station and the terminal may predefine that the SS block transmission period X is applied to a case in which an SS block is transmitted at every cycle T, and an SS block transmitted within a cycle T1 (e.g., T1=20 ms) is transmitted within a transmission period (X' ms, and 5 ms in the NR system) shorter than X. Alternatively, the terminal may receive the configured transmission period through a higher layer signal or system information.

In this example, a half-frame in which an SS block is transmitted a period of X at every cycle T may be identical to, or different from, a half-frame in which an SS block is transmitted at every cycle T' ms. For example, an SS block has been transmitted in a second half-frame within a cycle of T ms, but an SS block may be transmitted in a first half-frame or a second half-frame within a cycle of T' ms. An SS block has been transmitted over a first half-frame and s second half-frame within a cycle of T ms, but an SS block may be transmitted in only a first half-frame or only a second half-frame within a cycle of T' ms.

A transmission node (hereinafter, a "base station"), which transmits an SS block in an unlicensed band, performs a channel access procedure before a transmission time point of an SS block which is to be transmitted among the above-defined N transmissible SS blocks. If the unlicensed band is determined to be in an idle state, the base station may transmit an SS block, and the number of SS blocks transmissible within a particular time period may be limited to a maximum value of L (L≤N).

In this example, L may have a value which is predefined according to a frequency band or is declared by the base station. The terminal may receive a configured L from the base station through a higher layer signal. Values of L may be differently set according to subcarrier spacings of an SS block. A value of L may be changed according to a channel sensing procedure which has been applied during transmission of an SS block. For example, a value of L may be defined or set according to a channel access priority class or a channel access procedure performed by the base station. Transmission of an SS block may be limited such that only an SS block within a maximum channel occupancy time, which has been determined according to the channel access procedure performed by the base station, is transmitted. In this example, the base station may perform an additional channel access procedure after the maximum channel occupancy time, and may additionally transmit an SS block. Hereinafter, the maximum number L of SS blocks described in the disclosure may signify a value which is predefined for a particular unlicensed band, is declared by the base station, or is set for the terminal through a higher layer signal or system information by the base station. L may have a value which is independent of a value defined for a licensed band or is identical to a value defined for a licensed band.

A more specific example will be described below with reference to FIG. 7. The base station may transmit a maximum of L SS blocks with a subcarrier spacing of an SS block defined for a frequency band F of a particular unlicensed band. Consideration is given to and a description is made of a case in which the base station is to transmit two SS blocks among the L SS blocks. In this example, SS block indices of SS blocks that the base station is to transmit are an SS block #0 710, and an SS block #1 715. It is possible to assume that block indices #0 710 and #1 715 that the base station is to transmit are associated with a beam index #0 or a beam index #1, or a beam direction #0 or a beam direction #1, respectively. In this example, SS blocks #0 710 and #1 715 are only an example, and SS blocks that the base station is to transmit may be independently selected from among a maximum of transmissible SS blocks by the base station.

If the base station performs a channel access procedure before a transmission time point of the SS block #0 710 in order to transmit the SS block #0 710 and thus determines that the unlicensed band is not in an idle state, the base station may not transmit the SS block #0 710. If the base station performs a channel access procedure before a transmission time point of the SS block #1 715 and thus determines that the unlicensed band is in an idle state, the base station may transmit the SS block #1 715. Through the method proposed below, the base station may transmit the SS block, which has failed to be transmitted because of the channel access procedure, on an SS block transmission resource of one of an SS block #2 720 to an SS block #L−1 725, an SS block #L 730, and an SS block #N−1 740. For example, the base station may transmit an SS block desired to be transmitted using the SS block #0 710 on a resource of the SS block #2 720. In this example, the SS block that the base station has desired to transmit using the SS block #0 710 may imply that SS blocks are transmitted in beam directions #0 and #1 in which the base station has desired to perform transmission by using the SS blocks #0 710 and #1 715, respectively.

In this example, the detected SS block index information may be associated with, or mapped to, transmission of a PRACH by a terminal. In other words, the terminal may determine a PRACH resource by using an SS block index, detected by the terminal itself, in the following order. 1) In ascending order of RACH preamble indices with respect to a transmission occasion of one PRACH, 2) In ascending order of frequency resource indices of a PRACH occasion multiplexed on the frequency axis, 3) In ascending order of time resource indices of a PRACH occasion multiplexed on the time axis in a PRACH transmission slot, 4) In ascending order of PRACH slot indices, wherein a PRACH resource may be determined using 1), 2), 3), and 4). In other words, in the above-described example, the base station basically uses SS block #0 710 and #1 715 to perform SS block transmission, and thus a PRACH source will also be configured on the assumption of PRACH resources mapped to the SS block #0 710 and the SS block #1 715. However, if the terminal detects the SS block #2 720 when the opportunity of transmission of an SS block is additionally given as in the above-described example, the terminal may select a PRACH resource mapped to the SS block #2 720. In this example, since the base station has not configured a PRACH resource mapped to the SS block #2 720, if the above-described SS block transmission scheme is used, there may occur a case in which the terminal fails to correctly select a PRACH resource. Therefore, for the above-described method, reception of an SS block by the terminal, a synchronization acquisition procedure of the terminal, and correct selection of a PRACH resource by the terminal are needed.

A procedure for receiving an SS block and acquiring synchronization by a terminal when a base station transmits an SS block by through the above-described method will be described below. An initial access terminal attempts to detect a synchronization signal (e.g., a PSS) in a particular frequency band, when a PSS is detected, acquires a cell ID by detecting an SSS transmitted together with the PSS, and decodes a PBCH by using the detected cell ID. The terminal may acquire SFN information through the decoded PBCH, and may acquire slot and symbol synchronization by using an index or time domain resource location information of the detected SS block.

In this example, a DMRS sequence used to demodulate a PBCH may be initialized using index information of a maximum of eight SS blocks. Accordingly, according to the maximum of transmissible SS blocks or a frequency band, the terminal may acquire an index of an SS block through the DMRS sequence used to demodulate the PBCH, or may acquire 3-bit LSBs among index information of an SS block through the DMRS sequence used to demodulate the PBCH, and may acquire remaining SS block index information through information (MSB of SS/PBCH block index) included in the PBCH. In other words, if the maximum of transmissible SS blocks is less than or equal to 8, the terminal may acquire an SS block index through only the DMRS sequence used to demodulate the PBCH.

If in FIG. 7 and the above-described example, the number of SS blocks transmissible in a particular time period is N (N≤8), the terminal may acquire an SS block index #2 720 through a DMRS sequence used to demodulate a PBCH transmitted using an SS block #2 720. If N≥8, through a DMRS sequence used to demodulate a PBCH and information included in the PBCH, the terminal may acquire the SS block index #2 720. In this example, acquisition of 3-bit LSBs among index information of an SS block through the DMRS in only an example, and thus the terminal may acquire LSB, the number of bits of which is greater than 3 bits, through a DMRS sequence.

The terminal having detected the SS block #2 720 knows time domain location of the SS block #2 720, and thus may correctly acquire synchronization through the SFN information acquired through the PBCH and time domain location of the SS block #2 720. The terminal having acquired the synchronization may acquire system information through a system information block (SIB). Thereafter, the terminal may receive, through bitmap information, information on an SS block (ssb-PositionsInBurst) (e.g., SS block index information transmitted by the base station or transmitted SS block group information, and SS block index information transmitted by the group) actually transmitted using the SIB information by the base station. In this example, information on SS block transmission transmitted using the SIB by the base station may be information on SS block transmission in a case where the base station assumes that a channel access procedure has been successfully performed. In the above-described example, the base station may transmit, to the terminal, information on SS block transmission through the SIB, judging that the SS block #0 710 and the SS block #1 715 are transmitted.

The terminal, which has received information on SS block transmission through the SIB, may determine the number N' of SS blocks transmission by the base station, based on the information. In the above-described embodiment of the disclosure, the terminal may determine that the base station transmits two SS blocks. The terminal, which has determined the number of SS blocks that the base station is to actually transmit through the SIB information as described above, may determine an actual value of an SS block index that the terminal has received, has detected, or acquired, based on an SS block index x' used to acquire synchronization by the terminal itself and the number N' of SS blocks that the base station is to actually transmit through the SIB. For example, the terminal may identify a PRACH resource by using the actual value of the SS block index. For example, the terminal may determine that an SS block index is expressed by x=x' modulo N'. In this example, the modulo operation is only an example, and the terminal may determine an SS block index through another mathematical expression which provides the same result as that of the modulo operation. For example, an SS block index may be expressed by x=x'−N'*floor(x'/N'). In this example, the terminal may use the mathematical expression on the assumption that N' is the maximum number of transmissible SS blocks in a frequency band in which an SS block is transmitted.

In the above-described example, the terminal detects the SS block #2 720, and determines through the SIB that the base station transmits two SS blocks. Therefore, the terminal may determine that an index of the detected SS block is #0, and may use a PRACH resource of the SS block #0 710. The terminal determines an actual value of the SS block index acquired by the terminal, based on the SS block index x' acquired by the terminal and the number N' of SS blocks that the base station is to actually transmit through the SIB information. This configuration may be applied not only to a case in which a PRACH source is determined, but also to a case in which the strength of signal, the quality of a signal, and the like are measured using an SS block. For example, consideration is given to a case in which the terminal is configured to monitor the quality of a radio link (radio link monitoring (RLM)) by using the SS block #0 710 by a base station. If as in the above-described example, the base station fails to transmit the SS block #0 710 and transmits the SS blocks #1 715 and #2 720 as a result of execution of a channel access procedure, the terminal may measure the quality of a radio link by using an SS block transmitted using the SS block #2 720. In this example, the terminal may not measure the quality of a radio link in a resource of the SS block #0 710. In this configuration, Method 1 can be applied to an SS block index determination method for determining a PRACH resource, measuring RLM, and measuring SS block quality, and another operation associated with an SS block index.

Method 1 is appropriate for a case in which the number of SS blocks, which can be mapped within a particular time period X, is less than or equal to the maximum number of SS blocks supported by the system. For example, the NR system is designed such that a maximum of 64 SS blocks can be transmitted in a particular frequency band. If the number of SS blocks, which can be mapped within the particular time period X, is greater than 64 (e.g., a subcarrier spacing of an SS block is greater than 120 kHz), the number of SS blocks, which can be mapped according to the particular time period, may be greater than 64. For the above-described case, a second embodiment or a third embodiment may be employed. Method 1 of the first embodiment may be applied to a case in which, in the NR system, the system is extended or changed so that SS blocks, the number of which is greater than 64, can be transmitted.

Second Embodiment

Another method for, as compared with a case in which an SS block is transmitted in a licensed band, increasing a probability or an opportunity that an SS block will be transmitted in an unlicensed band will be described below. In a second method, additional information on an SS block index is transmitted through a PBCH.

Figure 8:
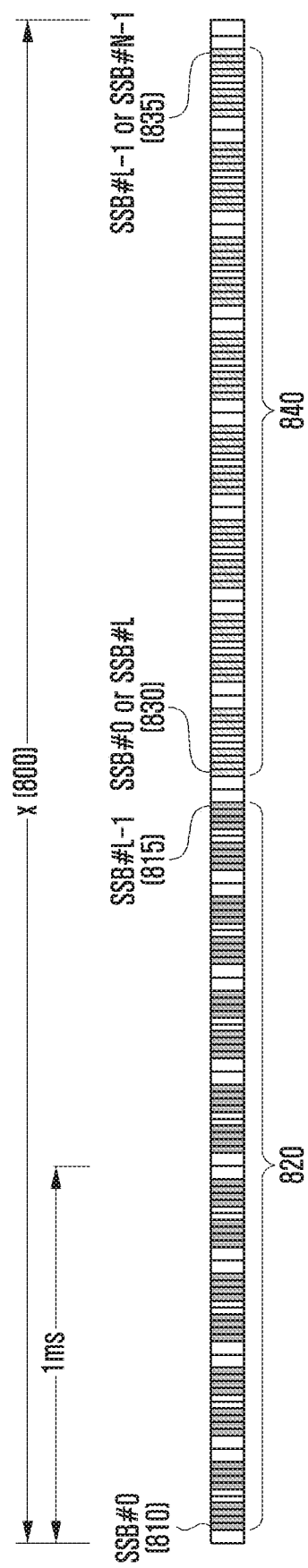
FIG. 8 is a view illustrating an embodiment according to an embodiment of the disclosure.

FIG. 8 is a view illustrating an embodiment according to an embodiment of the disclosure.

Referring to FIG. 8, a time domain resource which is related to an SS block candidate and on which an SS block can be transmitted with a particular subcarrier spacing within a particular time period X (e.g., 5 ms) is illustrated. For example, currently, in the NR standards, when SS blocks transmitted with a subcarrier spacing of 240 kHz are transmitted, the maximum number L of SS blocks is defined as 64. In FIG. 8, an SS block index is mapped from 0 to N−1 in order of time or slot indices, and N and L may be configured such that N>L. If N>L, after L SS block indices are mapped, an SS block index may again returns to zero so as to be mapped. For example, SS block indices of N SS blocks may be sequentially mapped to #0, #1, . . . , #L−1, #0, #1, . . . #N−L−1.

In contrast, the SS block indices do not return and may be sequentially mapped up to N. For example, SS block indices of N SS blocks may be sequentially mapped to #0, #1, . . . , #N−2, #N−1. In this example, in order to indicate a value of N>L, a size of a bit string of SS block indices delivered through a PBCH in an SS block may be increased. For example, if N=128, in order to indicate L(=64) SS block indices in a current licensed band, the size of 3-bit SS block index field delivered through a PBCH in an SS block may be increased to 4 bits. In order to a value of N>L for the above-described case, a size of a bit string of an SS block index delivered through a PBCH in an SS block may be maintained, (e.g., even if N=128, a size of 3-bit SS block index field delivered through a PBCH in an SS block in order to L(=64) SS block indices in a current licensed band is maintained), and the number of SS blocks associated with or mapped to a DMRS sequence may be increased.

In this example, a value of N may be changed according to the particular time period. For example, the maximum number of SS blocks transmissible within the particular time period X 800 may be N' (N' For example, the maximum number of SS blocks transmissible within the particular time X1 ms may be N1, and the maximum number of SS blocks transmissible within the particular time X2 ms may be N2. A reception node (hereinafter, a "terminal") may receive the configured value of N from a transmission node through a higher layer signal. Values of N may be differently set according to a subcarrier spacing of an SS block. In this example, X may be predefined as a half-frame or frame time, or the like between a base station and the terminal, or may be configured through a higher layer signal by the base station, and the SS block transmission periods X may be differently configured according to SS block transmission cycles or periods during which SS blocks are transmitted within an SS block transmission cycle.

For example, the terminal assumes that PBCH information at least except for an SFN is not changed within T ms (80 ms in the NR system). Accordingly, the SS block transmission period X may applied at every cycle of T ms, and an SS block transmitted within the cycle of T ms (e.g., T'=20 ms) may be transmitted within a transmission period (X' ms, and 5 ms in the NR system) shorter than X. In this example, a half-frame in which an SS block is transmitted a period of X within a cycle of T ms may be identical to, or different from, a half-frame in which an SS block is transmitted at every cycle T' ms. For example, an SS block has been transmitted in a second half-frame within a cycle of T ms, but an SS block may be transmitted in a first half-frame or a second half-frame within a cycle of T' ms. An SS block has been transmitted over a first half-frame and s second half-frame within a cycle of T ms, but an SS block may be transmitted in only a first half-frame or only a second half-frame within a cycle of T' ms.

As in the current NR standards, in order to map SS block transmissible resources, the number of which is greater than the maximum number of SS blocks (e.g., L=64) supported by the system, additional information is needed, and the additional information may be transmitted through a PBCH. In an example of transmission of an SS block as illustrated in FIG. 8, with respect to an SS block 820 in a particular time period X 800 (e.g., a half-frame period), to a maximum of L SS blocks (an SS block #0 810 to an SS block #(L−1) 815) from an SS block #0 810, time domain resources, to which SS blocks are mapped, and SS block indices may be sequentially mapped. In this example, the number of SS blocks, which the base station is to actually transmit, may be less than or equal to L.

In order to increase the opportunity that an SS block will be transmitted in an unlicensed band, with respect to an additional time resource domain 840 in which an SS block can be transmitted during a particular time period X 800, to a maximum of L SS blocks (an SS block #0 830 to an SS block #(L−1) 835) from an SS block #0 830, time domain resources, to which SS blocks are mapped, and SS block indices may be sequentially mapped. In this example, as in Method 1 of the first embodiment of the disclosure, in relation to a maximum of transmissible SS blocks illustrated in FIG. 8, the base station may perform a channel access procedure for the unlicensed band before a transmission time point of an SS block that the base station is to transmit, and may transmit an SS block if it is determined through the channel access procedure that the unlicensed band is in an idle state.

When the terminal, which has received an SS block transmitted through Method 2, receives the SS block #0 830, the terminal may not determine whether the received SS block #0 is an SS block transmitted at a location of the SS block #0 810 or an SS block transmitted at a location of the SS block #0 830, and thus may not correctly acquire time synchronization. In order to address this issue, identifier information of k bits (e.g., one bit), which allows the terminal, which has received the SS block transmitted through Method 2, to determine whether the received SS block is an SS block transmitted through the additional transmission opportunity 840, may be transmitted through a PBCH.

In this example, the identifier information may newly added to a PBCH, at least one piece of information among pieces of information transmitted through an existing PBCH may be changed and then transmitted so as to be used as identifier information, or the terminal may reinterpret at least one piece of information among pieces of information transmitted through an existing PBCH as identifier information. For example, in the case of an unlicensed band, all SS block transmissions may be predefined to be performed in only a first half-frame or only a second half-frame, and half-frame timing information transmitted through a PBCH may be used as the identifier information. For example, in the case of an unlicensed band, all SS block transmissions may be defined to be performed in only the first half-frame, and if half-frame information acquired through a PBCH of the SS block #0 acquired by the terminal is zero, the terminal may determine that the SS block #0 810 is acquired. If the half-frame information acquired through the PBCH of the SS block #0 acquired by the terminal is 1, the terminal may determine that the SS block #0 830 is acquired.

In this example, the use of half-frame information as the identifier is only an example, and the information "subcarrier spacing for common control" or the information "DMRS type A position for PDSCH" may be used as the identifier. In this example, subcarrier spacing for common control, which is applied to an unlicensed band, may be fixed or predefined, or DMRS type A position for PDSCH may be fixed as symbol #2, symbol #3, or a first symbol of a data channel, and thus the information "subcarrier spacing for common control" or the information "DMRS type A position for PDSCH" may be used as the identifier. In this configuration, by using bits reserved by reducing the number of candidates of subcarrier spacing for common control, which is applied to an unlicensed band, a part of the identifier information may be delivered, and the remaining part thereof may be transmitted through an additional field of a PBCH. In addition, as described above, at least one piece of information among half-frame information, subcarrier spacing for common control, and DMRS type A position for PDSCH may be used as the identifier information. Alternatively, by using at least one piece of information among half-frame information, subcarrier spacing for common control, and DMRS type A position for PDSCH, a part of the identifier information may be delivered, and the remaining part thereof may be transmitted through an additional field of a PBCH.

A procedure for receiving an SS block and acquiring synchronization by a terminal when a base station transmits an SS block by through the above-described method will be described below. An initial access terminal attempts to detect a synchronization signal (e.g., a PSS) in a particular frequency band, when a PSS is detected, acquires a cell ID by detecting an SSS transmitted together with the PSS, and decodes a PBCH by using the detected cell ID. The terminal may acquire SFN information through the decoded PBCH, and may acquire slot and symbol synchronization by using an index or time domain resource location information of the detected SS block.

In this example, a DMRS sequence used to demodulate a PBCH may be initialized using index information of a maximum of eight SS blocks. Accordingly, according to the maximum of transmissible SS blocks or a frequency band, the terminal may acquire an index of an SS block through the DMRS sequence used to demodulate the PBCH, or may acquire 3-bit LSBs among index information of an SS block through the DMRS sequence used to demodulate the PBCH, and may acquire remaining SS block index information through information (MSB of SS/PBCH block index) included in the PBCH. In other words, if the maximum of transmissible SS blocks is less than or equal to 8, the terminal may acquire an SS block index through the DMRS sequence used to demodulate the PBCH.

If N is defined by N≤8 in FIG. 7 and the above-described example, the terminal may acquire an SS block index #2 through a DMRS sequence used to demodulate a PBCH transmitted using an SS block #2. If N>8, through a DMRS sequence used to demodulate a PBCH and information included in the PBCH, the terminal may acquire the SS block index #2. In this example, acquisition of 3-bit LSBs among index information of an SS block through the DMRS in only an example, and thus the terminal may acquire LSB, the number of bits of which is greater than 3 bits, through a DMRS sequence.

As described above, the terminal having received and detected the SS block may acquire system information through a system information block (SIB), and may receive, through bitmap information, information on an SS block (ssb-PositionsInBurst) (e.g., SS block index information transmitted by the base station or transmitted SS block group information, and SS block index information transmitted by the group) actually transmitted using the SIB information by the base station. In this example, information on SS block transmission transmitted using the SIB by the base station may be information on SS block transmission in a case where the base station assumes that a channel access procedure has been successfully performed.

The terminal, which has received information on SS block transmission through the SIB, may determine the number N' of SS blocks transmission by the base station, based on the information. In the above-described embodiment of the disclosure, the terminal may determine that the base station transmits two SS blocks. The terminal, which has determined the number of SS blocks that the base station is to actually transmit through the SIB information as described above, may determine an actual value of an SS block index that the terminal has received, has detected, or acquired, based on an SS block index x' used to acquire synchronization by the terminal itself and the number N' of SS blocks that the base station is to actually transmit through the SIB. For example, the terminal may determine that an SS block index is expressed by x=x' modulo N'. In this example, the modulo operation is only an example, and the terminal may determine an SS block index through another mathematical expression which provides the same result as that of the modulo operation. For example, an SS block index may be expressed by x=x'−N'*floor(x'/N'). In this example, the terminal may use the mathematical expression on the assumption that N' is the maximum number of transmissible SS blocks in a frequency band in which an SS block is transmitted.

The terminal determines an actual value of the SS block index acquired by the terminal, based on the SS block index x' acquired by the terminal and the number N' of SS blocks, which the base station is to actually transmit through the SIB information, or the maximum number of SS blocks transmissible in a frequency band for transmission of an SS block. This configuration may be applied not only to a case in which a PRACH source is determined, but also to a case in which the strength of signal, the quality of a signal, and the like are measured using an SS block. For example, consideration is given to a case in which, when the terminal is configured to monitor the quality of a radio link (radio link monitoring (RLM)) by using the SS block #x by a base station, as in the above-described example, the base station fails to transmit the SS block #x and transmits the SS blocks #y and #z as a result of execution of a channel access procedure. In this example, if the transmission of the SS block #z is the transmission of the SS block #x, the terminal may measure the quality of a radio link by using an SS block transmitted using the SS block #z. In this example, the terminal may not measure the quality of a radio link in the SS block #x. In this configuration, the above-described methods can be applied to an SS block index determination method for determining a PRACH resource, measuring RLM, and measuring SS block quality, and another operation associated with an SS block index.

Third Embodiment

Still another method for, as compared with a case in which an SS block is transmitted in a licensed band, increasing a probability or an opportunity that an SS block will be transmitted in an unlicensed band will be described below. In a third method, offset information on an SS block index is transmitted through a PBCH.

An example of FIG. 8 will be described below. Referring to FIG. 8, a definition is made of a time domain resource which is related to an SS block candidate and on which an SS block can be transmitted with a subcarrier spacing of 15 kHz within a particular time period X (=10 ms). In addition, an SS block index may be mapped from 0 to N−1 in order of time or slot indices. In this example, N, that is, the number of SS blocks transmissible in a particular time period, may have a value, which is predefined according to a frequency band or declared by a transmission node, and may be greater than or equal to the maximum number L of SS blocks which is defined in a licensed band. If N>L, after L SS block indices are mapped, an SS block index may again returns to zero so as to be mapped. For example, SS block indices of N SS blocks may be sequentially mapped to #0, #1, . . . , #L−1, #0, #1, . . . #N−L−1. In addition, a value of N may be changed according to the particular time period. For example, the maximum number of SS blocks transmissible within the particular time period X ms may be N. A reception node (hereinafter, a "terminal") may receive the configured value of N through a higher layer signal from a transmission node. Values of N may be differently set according to subcarrier spacings of an SS block.

In this example, X may be predefined as a half-frame or frame time, or the like between a base station and a terminal, or may be configured through a higher layer signal by the base station, and the SS block transmission periods X may be differently configured according to SS block transmission cycles or periods during which SS blocks are transmitted within an SS block transmission cycle. For example, with respect to an SS block transmitted at every cycle T1, the terminal assumes that PBCH information at least except for an SFN is not changed within T ms (80 ms in the NR system). Accordingly, the SS block transmission period X is applied at every cycle of T ms, and an SS block transmitted within a cycle of T ms (e.g., T'=20 ms) may be transmitted within a transmission period (X' ms, and 5 ms in the NR system) shorter than X.

In this example, a half-frame in which an SS block is transmitted a period of X within a cycle of T ms may be identical to, or different from, a half-frame in which an SS block is transmitted at every cycle T' ms. For example, an SS block has been transmitted in a second half-frame within a cycle of T ms, but an SS block may be transmitted in a first half-frame or a second half-frame within a cycle of T' ms. An SS block has been transmitted over a first half-frame and s second half-frame within a cycle of T ms, but an SS block may be transmitted in only a first half-frame or only a second half-frame within a cycle of T' ms.

The base station may transmit offset information on an SS block index through a PBCH of an SS block. In this example, offset information on an SS block index may be defined as a difference value between a reference time or a reference SS block index (e.g., an SS block #0) and an index value of a transmitted SS block, wherein the former becomes a reference point. A time domain or location for transmission of an SS block, transmitted with a particular subcarrier spacing in a particular frequency band, is predefined for each SS block index as illustrated in FIG. 6. In an example of FIG. 8, in an SS block transmitted with a subcarrier spacing of 240 kHz, a time domain or location in which each of the SS block #0 810 to the SS block #(N−1) 835 is transmitted.

When an SS block is transmitted in an unlicensed band, if the base station performs a channel access procedure in order to transmit the SS block #0 810 and determines through the channel access procedure that the unlicensed band is not in an idle state, the base station may not transmit an SS block #0 by using the SS block #0 810. If the base station transmits the non-transmitted SS block #0 at the location of the SS block #0 or #L 830, through a PBCH of an SS block transmitted at the location of the SS block #0 or #L 830, the base station may transmit an SS block index difference or an offset value (an L value in this example) between the actually-transmitted SS block and a reference SS block (e.g., the SS block #0 810), and thus allows the terminal having acquired the SS block #0 or #L 830 to acquire synchronization with reference to time domain information and an offset value of the SS block #0 or #L 830.

When an SS block is transmitted in an unlicensed band, if the base station performs a channel access procedure in order to transmit the SS block #0 810 and determines through the channel access procedure that the unlicensed band is in an idle state, the base station transmits the SS block #0 810. In this example, an SS block index offset value transmitted through a PBCH of the SS block #0 810 is zero. If the base station transmits the non-transmitted SS block #0 at the location of the SS block #(L−1) 815, through a PBCH of the SS block #(L−1) 815, the base station may transmit an SS block index difference or an offset value (an (L−1) value in this example) between an actually-transmitted SS block and a reference SS block (e.g., the SS block #0 810), and thus allows the terminal having received the SS block #0 815 to correctly acquire synchronization with reference to time domain information and an offset value of the SS block #(L−1) 815.

In this example, offset information on SS block indices may be transmitted as a different type of offset information. For example, the base station may configure offset information in a particular time unit (e.g., 1 ms, subframe length, slot length, or TTI) and may transmit the offset information through a PBCH. In other way, the base station may configure M SS blocks as groups and may configure information on SS block groups to which transmitted SS blocks belong and information on transmission order, locations, or indices of the transmitted SS blocks in the particular time unit or in each SS block group, and may configure different fields or one field for the configured information, and may transmit the configured information through a PBCH. Through the configured information, the terminal having received an SS block may determine offset information or time location information on the received SS block index, and may acquire correct time synchronization according to a result of the determination.

In the above-described example, when an SS block is transmitted in an unlicensed band, if the base station performs a channel access procedure in order to transmit an SS block #0 at the location of the SS block #0 810 and determines through the channel access procedure that the unlicensed band is not in an idle state, the base station may not transmit the SS block #0 810. Consideration is given to a case in which the base station transmits the non-transmitted SS block #0 at the location of the SS block #0 830. The base station may distinguish an SS block index offset value between the actually-transmitted SS block #0 830 and the predefined SS block #0 810 in a specific SS block group unit (e.g., eight SS blocks are considered as one group) of a PBCH of the SS block #0 830, and may transmit information on a group (in the above-described example, group #8 or a corresponding bit string, e.g., 1000), to which the SS block #0 830 belongs, and location, order, or index information (in the above-described example, first, index 0, or a corresponding bit string, e.g., 000) on the position of the SS block #0 830 in the group. The terminal having acquired the SS block #0 830 may acquire synchronization by using time domain information of the SS block #0 810.

In this example, offset information on SS block indices may be transmitted as a different type of information. For example, the base station may configure offset information in a particular time unit (e.g., 1 ms, subframe length, slot length, or TTI) and may transmit the offset information through a PBCH. In other way, the base station or may configure M SS blocks as groups and may configure information on SS block groups to which transmitted SS blocks belong and information on transmission order, locations, or indices of the transmitted SS blocks in the particular time unit or in each SS block group, and may configure different fields or one field for the configured information, and may transmit the configured information through a PBCH. The terminal having received an SS block may reinterpret new field information added to a PBCH or an existing field thereof as in Method 2 proposed in the second embodiment of the disclosure, may determine offset information or time location information on the received SS block index, and may acquire correct time synchronization according to a result of the determination.

In the above-described example, when an SS block is transmitted in an unlicensed band, if the base station performs a channel access procedure in order to transmit an SS block #0 by using the SS block #0 810 and determines through the channel access procedure that the unlicensed band is not in an idle state, the base station may not transmit the SS block #0 810. If the base station transmits the non-transmitted SS block #0 at the location of the SS block #0 or #L 830, the base station may provide notification of an SS block index offset value between the actually-transmitted SS block #0 830 and the predefined SS block #0 810 by using the following method.

The PBCH of the SS block #0 830 may be divided into a specific SS block group unit (e.g., eight SS blocks are considered as one group) included in a PBCH of the SS block #0 or #L 830. The base station may transmit information on a group (in the above-described example, group #0 or a corresponding bit string, e.g., 000), to which the SS block #0 or #L 830 belongs, and location, order, or index information (in the above-described example, first, index 0, or a corresponding bit string, e.g., 000) on the position of the SS block #0 or #L 830 in the group. The terminal may determine whether the indicated group belonging to an SS block group 820 or 840 as in the second embodiment by using, as the identifier (offset information), a particular field of a PBCH, for example, half-frame information, subcarrier spacing for common control, or DMRS type A position for PDSCH, and thus allows the terminal having acquiring the SS block #L 830 to acquire synchronization by using at least one piece of information among the acquired SS block group, index, and identifier information.

In this example, offset information on an SS block index may be transmitted as a different type of information. For example, the base station may sequentially configure M SS blocks as one group, and may transmit an index offset value of a group including SS blocks transmitted in the unlicensed band, to the terminal through a PBCH of the transmitted SS block with reference to an index value or a group index #0 of the group including the SS blocks transmitted in the unlicensed band determined to be in an idle state after execution of a channel access procedure. In this configuration, the index offset value of the group may be delivered through a new field of the PBCH, or may be transmitted through reinterpretation or reuse of a field already existing in the PBCH. For example, a field of a PBCH used to deliver an SS block index may be used to deliver the index offset value of the group.

M may be predefined according to a frequency band between the base station and the terminal, and the terminal may determine G representing the number of groups by using N representing the maximum number of SS blocks transmissible within a particular time X. For example, the terminal may determine that SS blocks of groups, the number of which is represented by G=floor (N/M), can be transmitted. In this example, the number of groups may be determined by G=ceiling(N/M), and only a maximum of N SS blocks may be transmitted. For example, the last SS blocks, the number of which is represented by ceiling(N/M)*M−N and which belong to the last group, may not be transmitted. In this example, the number G of SS block groups may be determined by a size of a field for delivering an SS block group index value within a PBCH. For example, if the group index value is delivered through a bit string of a bits, the maximum number of SS block groups may be represented by $G=2^a$. In this configuration, G may be determined as $G=min(floor(N/M) \text{ or } ceiling(N/M), 2^a)$.

In this example, the number of SS block groups may be predefined, and the number of SS blocks, which can be included in a group, may be changed. For example, the number G of SS block groups may be defined as a size of a field for delivering an SS block group index value within a PBCH, and for example, SS block groups, the maximum number of which is represented by $G=2^a$ may be defined if the group index value is delivered through a bit string of a bits. If the maximum number of SS blocks transmissible within a particular time X is N, the terminal may determine the number M of SS blocks included in an SS block group based on M=ceiling(N/G). In this example, according to values of N and G, the last group may include SS blocks, the number of which is represented by M−(G*ceiling(N/G)−N).

As described above, the terminal having received an SS block may receive an SS block group index value or offset value transmitted through a PBCH of the SS block, and may determine an index or time location information of the SS block, which the terminal has received as described above, based on the received value. The terminal may acquire synchronization with the base station by using the determined time location information. To this end, the terminal may determine an index or time location information of an SS block by using at least one of an index of the received SS block, a DMRS sequence associated with or mapped to an SS block index value in an SS block group including the received SS block, or an SS block index value or offset value transmitted through a PBCH of the received SS block.

Figure 9:
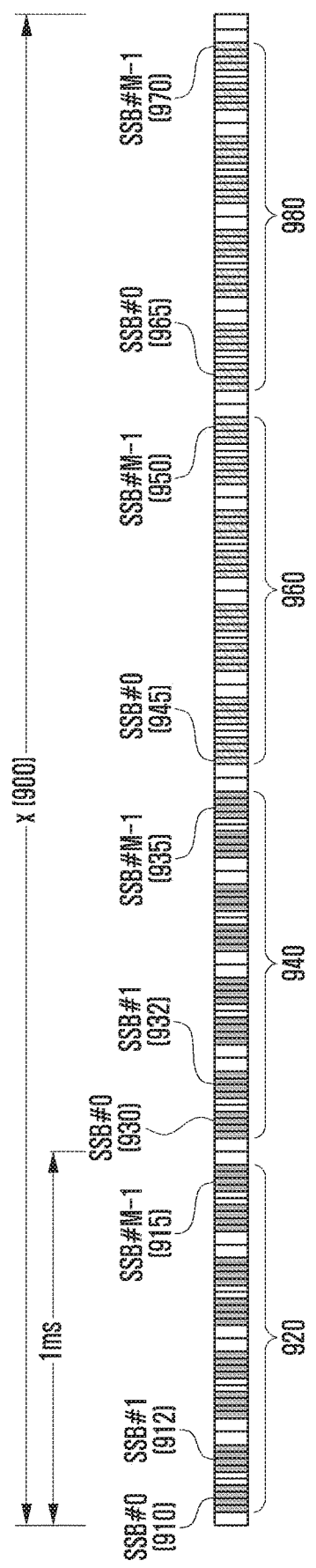
FIG. 9 is a view illustrating an embodiment according to an embodiment of the disclosure.

FIG. 9 is a view illustrating an embodiment according to an embodiment of the disclosure.

Referring to FIG. 9, an example of configuring eight SS blocks as one SS block group (M=8) when the maximum number of SS blocks transmissible within a particular time period X 900 is 32 (N=32) is illustrated. Accordingly, in FIG. 9, a total of four SS block groups (920, 940, 960, 980, G=floor(N/M)=4) exist.

In an example of transmission of an SS block as illustrated in FIG. 9, with respect to an SS block group 920 in a particular time period X 900, to M SS blocks (an SS block #0 910 to an SS block #(M−1) 915) from an SS block #0 910, time domain resources, to which SS blocks are mapped, and SS block indices may be sequentially mapped. In an example of transmission of an SS block as illustrated in FIG. 9, with respect to an SS block group 940 in a particular time period X 900, to M SS blocks (an SS block #0 930 to an SS block #(M−1) 935) from an SS block #0 930, time domain resources, to which SS blocks are mapped, and SS block indices may be sequentially mapped. In an example of transmission of an SS block as illustrated in FIG. 9, with respect to an SS block group 960 in a particular time period X 900, to M SS blocks (an SS block #0 945 to an SS block #(M−1) 950) from an SS block #0 945, time domain resources, to which SS blocks are mapped, and SS block indices may be sequentially mapped. In an example of transmission of an SS block as illustrated in FIG. 9, with respect to an SS block group 980 in a particular time period X 900, to M SS blocks (an SS block #0 965 to an SS block #(M−1) 970) from an SS block #0 965, time domain resources, to which SS blocks are mapped, and SS block indices may be sequentially mapped.

When an SS block is transmitted in an unlicensed band, if a base station performs a channel access procedure in order to transmit an SS block #0 910 and determines through the channel access procedure that the unlicensed band is not in an idle state, the base station may not transmit the SS block #0 910. For example, if the base station determines that the unlicensed band is in an idle state before a transmission time point of an SS block #1 912, the base station may transmit the SS block #1 912 to an SS block #0 930. A configuration in which the base station performs SS block transmission until an SS block related to a non-transmitted SS block (e.g., the SS block #0 910) is only an example, and the base station may perform SS block transmission for a previously-transmitted SS block index, according to an MCOT acquired through the channel access procedure performed before transmission of the SS block #1 912. For example, the SS block #1 912 and an SS block #1 932 may be transmitted.

The base station, which has transmitted the non-transmitted SS block #0 910 at the location of the SS block #0 930 as in the above-described example, may transmit, through a PBCH of the SS block #0 930, an index of the SS block group #1 940 including the actually-transmitted SS block #0 930, or a difference or an offset value (e.g., 01 bit string signifying 1) between the reference SS block group #0 920 and the index of the SS block group #1 940 including the above-described actually-transmitted SS block #0 930. The terminal having acquired the SS block #0 930 acquires an SS block index #0 by using at least one value among a DMRS sequence associated with or mapped to the SS block #0 and an SS block index value transmitted through a PBCH of the SS block #0 930. The terminal may acquire an SS block group index or offset value and an SS block index value within the group, and thus may perform synchronization with the base station by using the acquired information.

A procedure for receiving an SS block and acquiring synchronization by a terminal when a base station transmits an SS block by through the above-described method will be described below. An initial access terminal attempts to detect a synchronization signal (e.g., a PSS) in a particular frequency band, when a PSS is detected, acquires a cell ID by detecting an SSS transmitted together with the PSS, and decodes a PBCH by using the detected cell ID. The terminal may acquire SFN information through the decoded PBCH, and may acquire slot and symbol synchronization by using an index or time domain resource location information of the detected SS block.

In this example, a DMRS sequence used to demodulate a PBCH may be initialized using index information of a maximum of eight SS blocks. Accordingly, according to the maximum of transmissible SS blocks or a frequency band, the terminal may acquire an index of an SS block through the DMRS sequence used to demodulate the PBCH, or may acquire 3-bit LSBs among index information of an SS block through the DMRS sequence used to demodulate the PBCH, and may acquire remaining SS block index information through information (MSB of SS/PBCH block index) included in the PBCH. In other words, if the maximum of transmissible SS blocks is less than or equal to 8, the terminal may acquire an SS block index through the DMRS sequence used to demodulate the PBCH.

If N is defined by N≤8 in FIG. 7 and the above-described example, the terminal may acquire an SS block index #2 through a DMRS sequence used to demodulate a PBCH transmitted using an SS block #2. If N>8, through a DMRS sequence used to demodulate a PBCH and information included in the PBCH, the terminal may acquire the SS block index #2. In this example, acquisition of 3-bit LSBs among index information of an SS block through the DMRS in only an example, and thus the terminal may acquire LSB, the number of bits of which is greater than 3 bits, through a DMRS sequence.

As described above, the terminal having received and detected the SS block may acquire system information through a system information block (SIB), and may receive, through bitmap information, information on an SS block (ssb-PositionsInBurst) (e.g., SS block index information transmitted by the base station or transmitted SS block group information, and SS block index information transmitted by the group) actually transmitted using the SIB information by the base station. In this example, information on SS block transmission transmitted using the SIB by the base station may be information on SS block transmission in a case where the base station assumes that a channel access procedure has been successfully performed.

The terminal, which has received information on SS block transmission through the SIB, may determine the number N' of SS blocks transmission by the base station, based on the information. In the above-described embodiment of the disclosure, the terminal may determine that the base station transmits two SS blocks. The terminal, which has determined the number of SS blocks that the base station is to actually transmit through the SIB information as described above, may determine an actual value of an SS block index that the terminal has received, has detected, or acquired, based on an SS block index x' used to acquire synchronization by the terminal itself and the number N' of SS blocks that the base station is to actually transmit through the SIB. For example, the terminal may determine that an SS block index is expressed by x=x' modulo N'. In this example, the modulo operation is only an example, and the terminal may determine an SS block index through another mathematical expression which provides the same result as that of the modulo operation. For example, an SS block index may be expressed by x=x'−N'*floor (x'/N'). In this example, the terminal may use the mathematical expression on the assumption that N' is the maximum number of transmissible SS blocks in a frequency band in which an SS block is transmitted.

The terminal determines an actual value of the SS block index acquired by the terminal, based on the SS block index x' acquired by the terminal and the number N' of SS blocks, which the base station is to actually transmit through the SIB information, or the maximum number of SS blocks transmissible in a frequency band for transmission of an SS block. This configuration may be applied not only to a case in which a PRACH source is determined as described in the first embodiment of the disclosure, but also to a case in which the strength of signal, the quality of a signal, and the like are measured using an SS block. For example, consideration is given to a case in which, when the terminal is configured to monitor the quality of a radio link (radio link monitoring (RLM)) by using the SS block #x by a base station, as in the above-described example, the base station fails to transmit the SS block #x and transmits the SS blocks #y and #z as a result of execution of a channel access procedure. If the transmission of the SS block #z is the transmission of the SS block #x, the terminal may measure the quality of a radio link by using an SS block transmitted using the SS block #z. In this example, the terminal may not measure the quality of a radio link in the SS block #x. In this configuration, the above-described methods can be applied to an SS block index determination method for determining a PRACH resource, measuring RLM, and measuring SS block quality, and another operation associated with an SS block index.

An operation of a base station according to embodiments will be described below with reference to FIG. 10.

Figure 10:
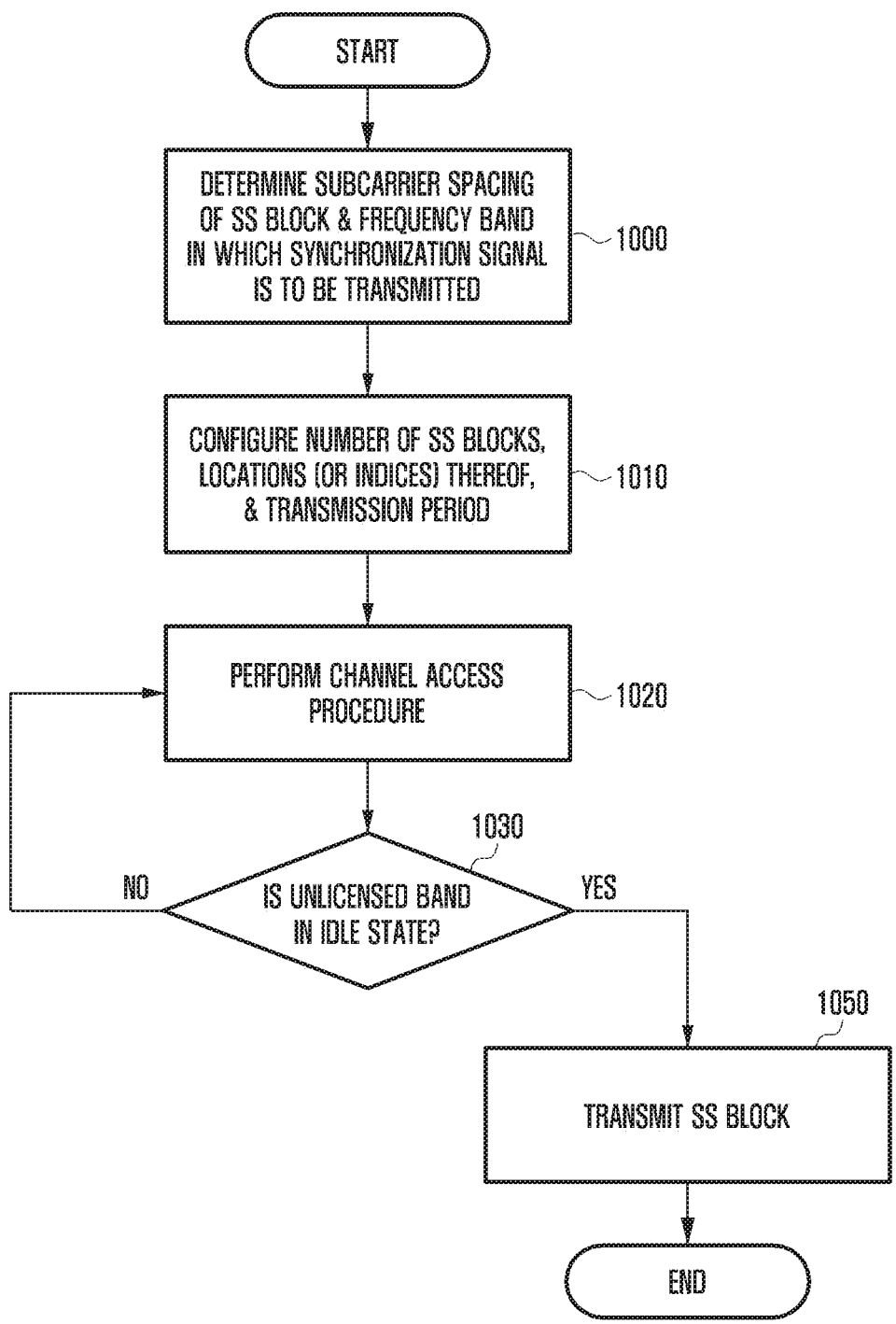
FIG. 10 is a flowchart illustrating an operation of a base station according to various embodiments of the disclosure.

FIG. 10 is a flowchart illustrating an operation of a base station according to various embodiments of the disclosure Referring to FIG. 10, in operation 1000, the base station determines a frequency band F, in which an SS block is to be transmitted, and a subcarrier spacing of an SS block defined for the frequency band F. In operation 1010, the base station determines and configures the number of SS blocks, which is to be transmitted, and locations thereof or indices thereof. If it is determined in operation 1000 that the frequency band F is an unlicensed band, the base station may configure an SS block transmission period X. In this example, X may be predefined as a half-frame time or a frame time, or the like between the base station and a terminal, or may be configured through a higher layer signal by the base station. Alternatively, values of the SS block transmission period X may be differently configured according to periods during which the SS blocks are transmitted within an SS block transmission cycle.

For example, the terminal assumes that PBCH information at least except for an SFN is not changed within T ms (80 ms in the NR system). Accordingly, the SS block transmission period X is applied at every cycle T ms, and an SS block transmitted within the cycle of T ms (e.g., T'=20 ms) may be transmitted within a transmission period (X' ms, and 5 ms in the NR system) shorter than X.

If it is determined in operation 1000 that the frequency band F is an unlicensed band, in operation 1020, the base station performs a channel access procedure for the unlicensed band before a pre-configured transmission time point of an SS block. Thereafter, in operation 1030, the base station determines whether the unlicensed band is in an idle state. If it is determined through the channel access procedure performed in operation 1020 that the unlicensed band is not in an idle state, in operation 1020, the base station may continuously perform a channel access procedure until the pre-configured transmission time point of an SS block, or may resume or again perform a channel access procedure before the pre-configured transmission time point of an SS block. If it is determined through the channel access procedure performed in operation 1020 that the unlicensed band is in an idle state, in operation 1050, the base station may transmit a configured SS block.

An operation of a terminal according to embodiments will be described below with reference to FIG. 11.

Figure 11:
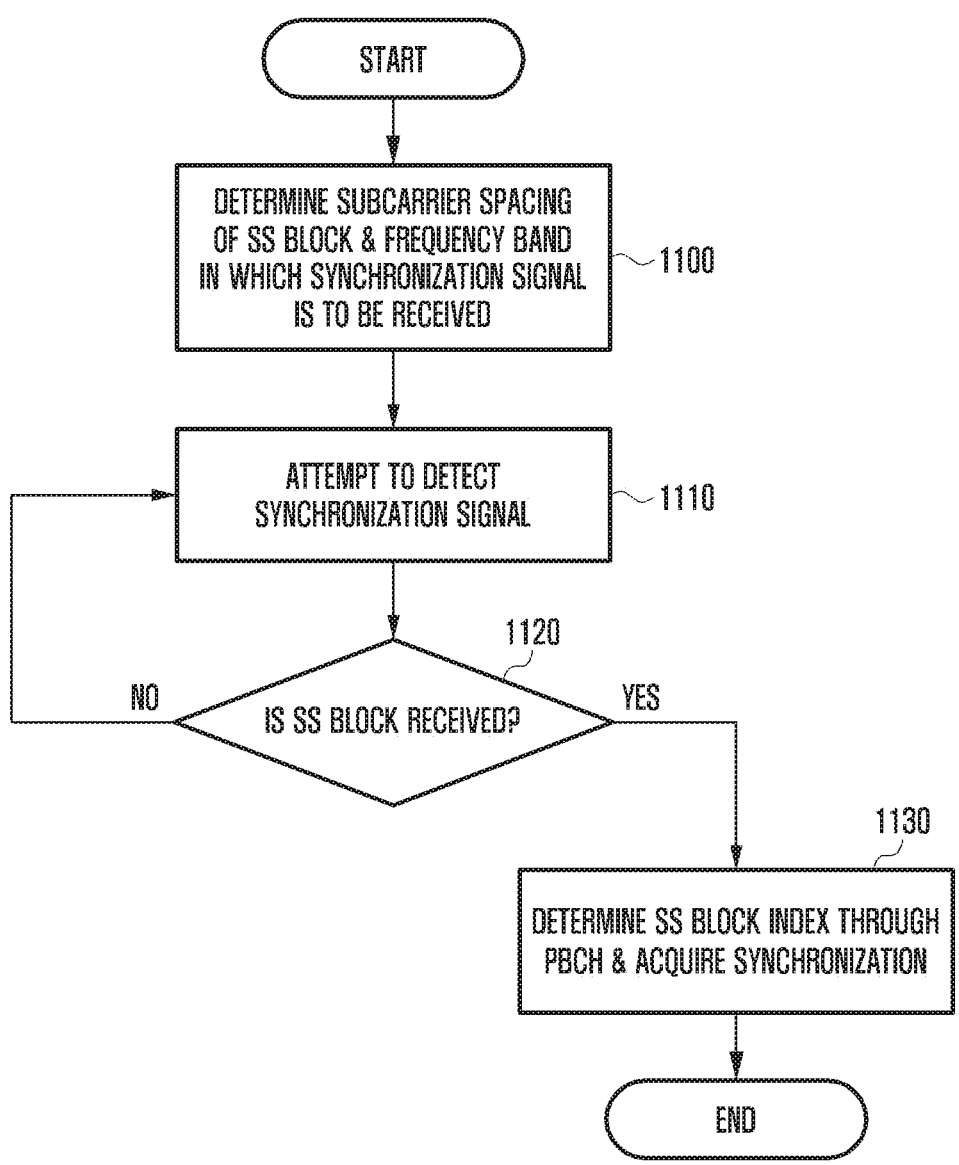
FIG. 11 is a flowchart illustrating an operation of a terminal according to various embodiments of the disclosure.

FIG. 11 is a flowchart illustrating an operation of a terminal according to various embodiments of the disclosure.

Referring to FIG. 11, in operation 1100, the terminal determines a frequency band, in which a synchronization signal is to be received, and determines a subcarrier spacing of an SS block which is defined for the determined frequency band. In operation 1110, by using the subcarrier spacing determined in operation 1100, the terminal attempts to detect a synchronization signal (e.g., a PSS). If it is determined in operation 1120 that an SS block is received, the terminal acquires a cell ID by detecting an SSS transmitted together with a PSS during detection of the PSS in operation 1130, and decodes a PBCH by using the detected cell ID. The terminal may acquire SFN information through the decoded PBCH, and may acquire slot and symbol synchronization by using an index or time domain location information of the detected SS block. In this example, a DMRS sequence used to demodulate a PBCH may be initialized using index information of a maximum of eight SS blocks. Accordingly, the terminal may acquire an index of an SS block according to the maximum number of transmissible SS blocks or a frequency band through the DMRS sequence used to demodulate the PBCH, or may acquire 3-bit LSBs among index information of an SS block through the DMRS sequence used to demodulate the PBCH, and may acquire the remaining index information of the SS block through information (MSB of SS/PBCH block index) included in the PBCH. In other words, if the maximum number of transmissible SS blocks is less than or equal to 8, the terminal may acquire an SS block index through the DMRS sequence used to demodulate the PBCH. If it is determined in operation 1120 that the SS block is not received, the terminal returns again to operation 1110 and attempts to detect a synchronization signal.

The terminal may additionally determine an actual value of the SS block index acquired according to the above-described embodiment of the disclosure. For example, the terminal, which has received an SS block transmitted through the method of the first embodiment of the disclosure, may determine the number of SS blocks configured by the base station, based on SS block-related information transmitted through SIB by the base station, and may perform a modulo operation on the acquired SS block index and the determined the number of SS blocks so as to determine an actual SS block index for determination of a PRACH resource of the SS block received by the terminal.

As another embodiment of the disclosure, a terminal, which has received an SS block transmitted through the method of the second embodiment of the disclosure, may determine an actual SS block index of the received SS block based on information transmitted through at least one field delivered through a PBCH, for example, half-frame information, subcarrier spacing for common control, DMRS type A position for PDSCH, or an identifier added for distinguishing between SS blocks. As still another embodiment of the disclosure, a terminal, which has received an SS block transmitted through the method of the third embodiment of the disclosure, may determine an actual SS block index of the received SS block based on SS block index offset information delivered through a PBCH.

Figure 12:
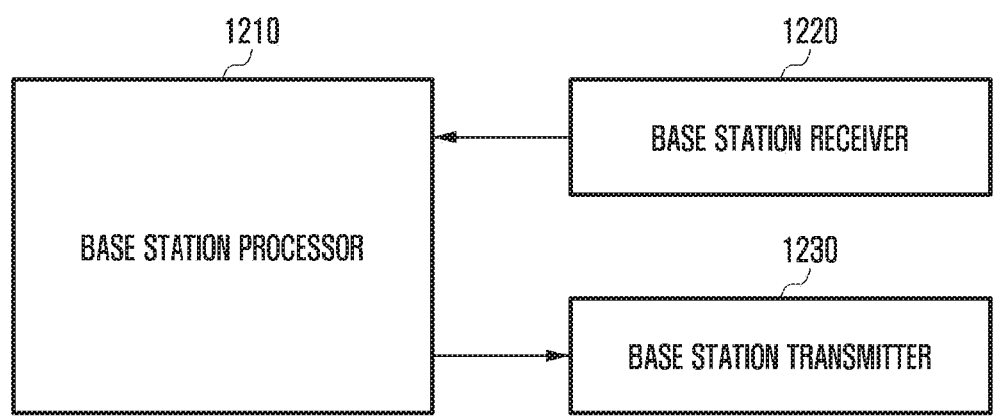
FIG. 12 is a block diagram illustrating a configuration of a base station according to various embodiments of the disclosure.

FIG. 12 is a block diagram illustrating a configuration of a base station according to embodiments of the disclosure.

Referring to FIG. 12, in the embodiment of the disclosure, the base station according to the disclosure may include a base station processor 1210, a base station receiver 1220, and a base station transmitter 1230. In embodiments of the disclosure, the base station receiver 1220 and the base station transmitter 1230 may be collectively referred to as a "transceiver". The transceiver may be configured to transmit or receive a signal to or from the terminal. The signal may include control information and data. To this end, the transceiver may include an RF transmitter configured to up-convert and amplify a frequency of the transmitted signal, an RF receiver configured to low-noise-amplify the received signal and down-convert the frequency, and the like. In addition, the transceiver may be configured to receive a signal through a radio channel and output the received signal to the base station processor 1210, and may be configured to transmit a signal output from the base station processor 1210 through a radio channel.

The base station processor 1210 may control a series of processes so that the base station can operate according to the above-described embodiments of the disclosure. For example, the base station receiver 1220 may receive a data signal including a control signal transmitted by the terminal, and the base station processor 1210 may determine a result of reception of a control signal and a data signal transmitted by the terminal. As another embodiment of the disclosure, the base station processor 1210 may perform a channel access procedure for an unlicensed band. As a specific embodiment of the disclosure, the base station receiver 1220 may receive signals in transmitted in an unlicensed band, and the base station processor 1210 may determine whether the unlicensed band is in an idle state by comparing the strength of the received signal and the like with a threshold which is predefined or determined by a value of a function that uses, as factors, a bandwidth and the like. In addition, the base station processor 1210 may maintain or change a value of a contention window for a channel access procedure according to a result of reception of a data signal by the terminal which has been received by the base station receiver 1220. If it is determined that the unlicensed band is in an idle state, the base station processor 1210 may transmit downlink signal, including an SS block, through the base station transmitter 1230. In this example, the base station transmitter 1230 may transmit, to the terminal, information, including information on an uplink or downlink transmission period, in a channel occupancy period of the unlicensed band determined by the base station processor 1210. In addition, according to a transmission location of an SS block, the base station may change and transmit, to the terminal, information transmitted through a PBCH of the SS block.

Figure 13:
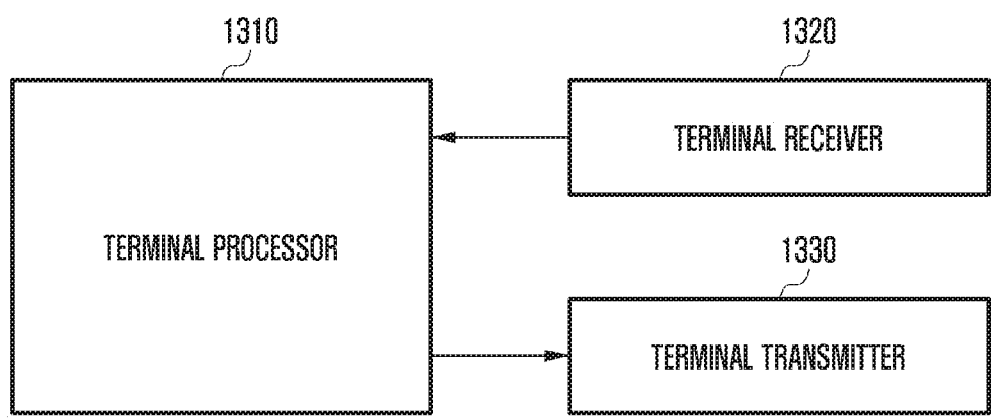
FIG. 13 is a block diagram illustrating a configuration of a terminal according to various embodiments of the disclosure.

FIG. 13 is a block diagram illustrating a configuration of a terminal according to embodiments of the disclosure.

Referring to FIG. 13, the terminal according to the disclosure may include a terminal receiver 1320, a terminal transmitter 1330, and a terminal processor 1310. In embodiments of the disclosure, the terminal receiver 1320 and the terminal transmitter 1330 may be collectively referred to as a "transceiver". The transceiver may be configured to transmit or receive a signal to or from a base station. The signal may include control information and data. To this end, the transceiver may include an RF transmitter configured to up-convert and amplify a frequency of the transmitted signal, an RF receiver configured to low-noise-amplify the received signal and down-convert the frequency, and the like. In addition, the transceiver may be configured to receive a signal through a radio channel and output the received signal to the terminal processor 1310, and may be configured to transmit a signal output from the terminal processor 1310 through a radio channel.

The terminal processor 1310 may be configured to control a series of processes so that the terminal can operate according to the above-described embodiments of the disclosure. For example, the terminal receiver 1320 may receive a data signal including a control signal, and the terminal processor 1310 may determine a result of reception of a data signal. Thereafter, when at the timing, it is necessary to transmit a result of reception of a first signal including reception of the data to the base station, the terminal transmitter 1330 transmits, to the base station, a result of reception of the first signal at timing determined by the terminal processor 1310. As another example, if the terminal receiver 1320 receives information on an uplink or downlink transmission period from the base station in a channel occupancy period of an unlicensed band, the terminal processor 1310 may reconfigure or change a downlink control channel transmission time or cycle of the terminal, and thus the terminal receiver 1320 may receive a downlink control channel transmitted by the base station. In addition, the terminal receiver 1320 of the terminal may receive, from the base station, a result of reception of uplink data transmitted by the terminal transmitter 1330. According to the received result, the terminal processor 1310 may maintain or change the size of a contention window used in a channel access procedure for transmitting a signal in an unlicensed band. In addition, the terminal receiver 1320 may receive an SS block transmitted by the base station, and the terminal processor 1310 may acquire time synchronization with the base station according to the received SS block. In this example, the terminal processor 1310 may acquire a cell ID from the receive SS block, may decode a PBCH of an SS block by using the acquired cell ID, and may acquire time synchronization with the base station by using the acquired information.

The embodiments shown and described in the specification and the accompanying drawings have been provided to easily describe the technical contents of the disclosure and help the understanding of the disclosure, and are not intended to limit the scope of the disclosure. It will be apparent to those skilled in the art to which the disclosure pertains that different modifications based on the technical idea of the disclosure can be practiced. Further, the embodiments can be combined as needed for implementation. For example, parts of the methods proposed in the disclosure may be combined with each other so as to be employed by a base station and a terminal. Further, the embodiments have been proposed with reference to an LTE/LTE-A system, but other modified embodiments based on the technical idea of the above-described embodiments may also be implemented for other systems, including a 5G system, an NR system, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
    identifying whether an unlicensed band is idle or not;
    transmitting at least one synchronization signal block (SSB) on the unlicensed band in a case that the unlicensed band is idle; and
    receiving, from a terminal, a physical random access channel (PRACH) preamble on a PRAM resource,
    wherein the PRACH resource corresponds to an SSB index for identifying the PRACH resource,
    wherein the SSB index for identifying the PRACH resource depends on an index of an SSB among the at east one SSB and a number of SSBs for the unlicensed hand, and
    wherein information on the number of SSBs for the unlicensed band is transmitted to the terminal.

2. The method of claim 1, wherein the SSB index of the SSB is indicated by a demodulation reference signal (DMRS) sequence included in the SSB.

3. The method of claim 1,
    wherein the SSB index for identifying the PRACH resource is identified based on a modulo operation using the SSB index of the SSB and the number of SSBs for the unlicensed band.

4. The method of claim 1, wherein the information on the number of SSBs for the unlicensed band is included in a master information block (MIB).

5. The method of claim 1, wherein the information on the number of SSBs for the unlicensed band is included in higher layer signaling.

6. A method performed by a terminal in a wireless communication system, the method comprising:
    receiving at least one synchronization signal block (SSB) transmitted from a base station on an unlicensed band;
    identifying at least one SSB index of the at least one SSB; and
    acquiring a time synchronization with the base station based on the received at least one SSB and identifying a physical random access channel (PRACH) resource corresponding to an SSB among the at least one SSB, wherein an SSB index for identifying the PRACH resource is identified based on the identified SSB index of the SSB and a number of SSBs for the unlicensed band, and wherein information on the number of SSBs for the unlicensed band is transmitted from the base station.

7. The method of claim 6, further comprising:
transmitting, to the base station, a PRACH preamble on the PRACH resource.

8. The method of claim 6, wherein the SSB index for identifying the PRACH resource is identified based on a modulo operation using the identified SSB index of the SSB and the number of SSBs for the unlicensed band.

9. The method of claim 6, wherein the information on the number of SSBs for the unlicensed band is included in a master information block (MIB).

10. The method of claim 6, wherein the information on the number of SSBs for the unlicensed band is included in higher layer signaling.

11. A base station in a wireless communication system, the base station comprising:
a transceiver; and a controller coupled with the transceiver and configured to:
identify whether an unlicensed band is idle or not,
transmit at least one synchronization signal block (SSB) on the unlicensed band in a case that the unlicensed band is idle, and
receive, from a terminal, a physical random access channel (PRACH) preamble on a PRACH resource,
wherein the PRACH resource corresponds to an SSB index for identifying the PRACH resource,
wherein the SSB index for identifying the PRACH resource depends on an index of an SSB among the at least one SSB and a number of SSBs for the unlicensed hand, and
wherein information on the number of SSBs for the unlicensed band is transmitted to the terminal.

12. The base station of claim 11, wherein the SSB index of the SSB is indicated by a demodulation reference signal (DMRS) sequence included in the SSB.

13. The base station of claim 11, wherein the SSB index for identifying the PRACH resource is identified based on a modulo operation using the SSB index of the SSB and the number of SSBs for the unlicensed band.

14. The base station of claim 11, wherein the information on the number of SSBs for the unlicensed band is included in a master information block (MIB).

15. The base station of claim 11, wherein the information on the number of SSBs for the unlicensed band is included in higher layer signaling.

16. A terminal in a wireless communication system, the terminal comprising:
a transceiver; and
a controller coupled with the transceiver and configured to:
receive at least one synchronization signal block (SSB) transmitted from a base station on an unlicensed band,
identify at least one SSB index of the at least one SSB, and
acquire a time synchronization with the base station based on the received at least one SSB and identify a physical random access channel (PRACH) resource corresponding to an SSB among the at least one SSB,
wherein an SSB index for identifying the PRACH resource is identified based on the identified SSB index of the SSB and a number of SSBs for the unlicensed band, and
wherein information on the number of SSBs for the unlicensed band is transmitted from the base station.

17. The terminal of claim 16, wherein the controller is further configured to:
transmit a PRACH preamble on the PRACH resource.

18. The terminal of claim 16,
wherein the SSB index for identifying the PRACH resource is identified based on a modulo operation using the identified SSB index of the SSB and the number of SSBs for the unlicensed band.

19. The terminal of claim 16, wherein the information on the number of SSBs for the unlicensed band is included in a master information block (MIB).

20. The terminal of claim 16, wherein the information on the number of SSBs for the unlicensed band is included in higher layer signaling.

* * * * *